US011486694B2

(12) United States Patent
Laman

(10) Patent No.: US 11,486,694 B2
(45) Date of Patent: Nov. 1, 2022

(54) CHROMATIC RANGE SENSOR SYSTEM FOR MEASURING WORKPIECE THICKNESS

(71) Applicant: Mitutoyo Corporation, Kanagawa-ken (JP)

(72) Inventor: Norman Laman, Kenmore, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 158 days.

(21) Appl. No.: 17/126,191

(22) Filed: Dec. 18, 2020

(65) Prior Publication Data

US 2022/0196388 A1 Jun. 23, 2022

(51) Int. Cl.
*G01B 11/06* (2006.01)
*G02B 21/00* (2006.01)

(52) U.S. Cl.
CPC .......... *G01B 11/06* (2013.01); *G02B 21/0064* (2013.01); *G01B 2210/50* (2013.01)

(58) Field of Classification Search
CPC . G01B 11/06; G01B 2210/50; G02B 21/0064
See application file for complete search history.

(56) References Cited

U.S. PATENT DOCUMENTS

| 6,542,180 | B1 | 4/2003 | Wasserman et al. |
| 7,030,351 | B2 | 4/2006 | Wasserman et al. |
| 7,324,682 | B2 | 1/2008 | Wasserman |
| 7,443,413 | B2 | 10/2008 | Jodra et al. |
| 7,454,053 | B2 | 11/2008 | Bryll et al. |
| 7,477,401 | B2 | 1/2009 | Marx et al. |
| 7,570,795 | B2 | 8/2009 | Yu et al. |
| 7,626,705 | B2 | 12/2009 | Altendorf |
| 7,627,162 | B2 | 12/2009 | Blanford et al. |

(Continued)

OTHER PUBLICATIONS

O' Haver, Tom. "Fourier Deconvolution," <https://terpconnect.umd.edu/~toh/spectrum/Deconvolution.html>, available 2008, accessed Jul. 18, 2022. (Year: 2008).*

(Continued)

*Primary Examiner* — Rebecca C Bryant
(74) *Attorney, Agent, or Firm* — Seed IP Law Group LLP

(57) ABSTRACT

A chromatic range sensor (CRS) system is provided that determines a workpiece thickness and includes an optical pen, an illumination source, a wavelength detector and a processing portion. The optical pen includes an optics portion providing axial chromatic dispersion, the illumination source is configured to generate multi-wavelength light and the wavelength detector includes a plurality of pixels distributed along a measurement axis. In operation, the optical pen inputs a spectral profile from the illumination source and outputs corresponding radiation to first and second workpiece surfaces of a workpiece (e.g., which may be transparent) and outputs reflected radiation to the wavelength detector which provides output spectral profile data. The processing portion processes the output spectral profile data to determine a thickness of the workpiece. In various implementations, the processing to determine the thickness may not rely on determining a distance to the workpiece and/or may utilize transform processing, etc.

24 Claims, 18 Drawing Sheets

(56) References Cited

U.S. PATENT DOCUMENTS

| | | | |
|---|---|---|---|
| 7,876,456 B2* | 1/2011 | Sesko | G01B 21/045 |
| | | | 356/609 |
| 7,990,522 B2 | 8/2011 | Sesko | |
| 8,085,295 B2 | 12/2011 | Tobiason et al. | |
| 8,111,905 B2 | 2/2012 | Campbell | |
| 8,111,938 B2 | 2/2012 | Bryll et al. | |
| 8,142,050 B2 | 3/2012 | Emtman et al. | |
| 8,194,251 B2 | 6/2012 | Emtman et al. | |
| 8,212,997 B1 | 7/2012 | Xie | |
| 8,317,347 B2 | 11/2012 | Gladnick et al. | |
| 8,456,637 B2 | 6/2013 | Emtman et al. | |
| 8,581,162 B2 | 11/2013 | Campbell | |
| 8,587,772 B2 | 11/2013 | Sesko et al. | |
| 8,587,789 B2 | 11/2013 | Sesko | |
| 8,736,817 B2 | 5/2014 | Jones et al. | |
| 8,773,757 B2 | 7/2014 | Chen et al. | |
| 8,817,240 B2 | 8/2014 | Jones et al. | |
| 8,860,931 B2 | 10/2014 | Patzwald | |
| 8,928,874 B2 | 1/2015 | Patzwald | |
| 9,060,117 B2 | 6/2015 | Bryll et al. | |
| 9,068,822 B2 | 6/2015 | Sesko | |
| 9,115,982 B2 | 8/2015 | Jones et al. | |
| 9,143,674 B2 | 9/2015 | Gladnick | |
| 9,261,351 B1 | 2/2016 | Patzwald | |
| 9,329,026 B2 | 5/2016 | Altendorf | |
| 9,651,764 B2 | 5/2017 | Harsila | |
| 9,774,765 B2 | 9/2017 | Bryll et al. | |
| 9,829,312 B2 | 11/2017 | Xie | |
| 9,830,694 B2 | 11/2017 | Bryll | |
| 9,958,266 B2 | 5/2018 | Patzwald et al. | |
| 9,958,294 B2 | 5/2018 | Cook | |
| 2010/0097779 A1 | 4/2010 | Gladnick et al. | |
| 2010/0284025 A1 | 11/2010 | Sesko | |
| 2016/0018213 A1* | 1/2016 | Miki | G01B 11/06 |
| | | | 356/632 |
| 2018/0364028 A1* | 12/2018 | Piel | G01B 9/02044 |
| 2022/0176513 A1* | 6/2022 | Watanabe | B24B 37/013 |

OTHER PUBLICATIONS

Chanbai, "Development of a Confocal Line Scanning Sensor," Dissertation, University of Siegen, Oct. 22, 2012, 171 pages. (English text with German introduction).

Kagawa et al., "Multi-beam confocal microscopy based on a custom image sensor with focal-plane pinhole array effect," *Optics Express* *21*(2), pp. 1417-1429 Jan. 28, 2013, (14 pages).

Mitutoyo Corporation & Micro Encoder Inc. "QVPAK® 3D CNC Vision Measuring Machine," User's Guide, Version 7, 2003, 329 pages.

Molesini et al., "Pseudocolor Effects of Longitudinal Chromatic Aberration," J. Optics (Paris), 1986, 17(6), pp. 279-282 (4 pages).

\* cited by examiner

CHROMATIC RANGE SENSOR SYSTEM FOR MEASURING WORKPIECE THICKNESS

BACKGROUND

Technical Field

The invention relates to precision measurement instruments, and more particularly to chromatic range sensors and similar optical distance determining devices, and their use.

Description of the Related Art

It is known to use chromatic confocal techniques in optical range sensors (e.g., including height, distance, etc., sensors). As described in U.S. Pat. No. 7,876,456 (the '456 patent), which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the aperture. All of the other wavelengths are poorly focused on the aperture, and so will not couple much power into the fiber. Therefore, for the light returned through the fiber, the signal level will be greatest for the wavelength corresponding to the surface height or distance to the surface. A spectrometer-type detector measures the signal level for each wavelength, in order to determine the surface height.

Certain manufacturers refer to practical and compact chromatic range sensing (CRS) systems that operate as described above, and that are suitable for use in an industrial setting, as chromatic point sensors (CPS) or chromatic line sensors, or the like. A compact chromatically-dispersive optical assembly used with such systems is referred to as an "optical pen," or a "pen." The optical pen is connected through an optical fiber to an electronic portion of the chromatic range sensor. The electronic portion includes a light source that transmits light through the fiber to be output from the optical pen, and also provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength position coordinate" as indicated by a peak or centroid of the intensity profile, and the resulting pixel coordinate of the peak and/or centroid is used with a lookup table to determine the distance to the surface. This pixel coordinate may be determined with sub-pixel resolution, and may be referred to as the "distance-indicating coordinate" or "distance indicating pixel coordinate."

Also known in the art is a "line sensor" CRS, which uses a slit aperture and focuses light along a line rather than a point, providing the capability to measure a distance to a surface at a number of points along that line, as disclosed in U.S. Pat. No. 8,773,757, which is hereby incorporated herein by reference in its entirety.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Prior art CRS systems have exhibited certain issues (e.g., measurement errors, etc.) in relation to thickness measurements, which have typically involved determining measurement distances to two opposing surfaces of a workpiece and determining a difference between the two measurement distances. For example, when measuring a thickness of a transparent workpiece, like glass (e.g., fused silica), the CRS illumination will reflect from both the top surface and the bottom surface of the glass, resulting in two corresponding wavelength peaks. Certain measurement errors arise from difficulties associated with isolating the two peaks of the intensity profile indicative of the two respective measurement distances, for which the two peaks tend to merge together for thin workpieces. For example, the widths of the two peaks may be such that the peaks at least partially overlap/merge due to an insufficient separation between the two peaks (e.g., as illustrated, for example, in the dotted-line measurement profile signals 510a of FIG. 5A, and in FIGS. 10A, 10B, 10D, 10E and 10G, as will be described in more detail below).

In particular with regard to the examples of FIGS. 10A-10G, seven corresponding intensity profiles are illustrated, each including two measurement peaks (e.g., merging to a single peak in FIG. 10A) which are indicative of measurement distances to top and bottom surfaces of workpieces having varying thicknesses. For example, FIGS. 10A and 10D correspond to a workpiece with a thickness of 25 µm, FIGS. 10B and 10E correspond to a workpiece with a thickness of 50 µm, and FIGS. 10C and 10F correspond to a workpiece with a thickness of 100 µm. The intensity profiles of FIGS. 10A-10G comprise intensity or "signal level" (vertical axis) as a function of pixel coordinates or "pixel positions" (horizontal axis) of a CRS wavelength detector, wherein the pixel positions correspond to wavelengths measured by the CRS wavelength detector and the CRS system is calibrated to convert the wavelength peaks to CRS measurement distances. Correspondingly, in accordance with certain previously known methods, a thickness of a workpiece may be determined in accordance with a difference between the measurement distances to the two workpiece surfaces.

In some implementations, such as illustrated in the examples of FIGS. 10A-10C, the merging of two peaks may become more severe in the blue part (i.e., blue light wavelengths part) of the Z range of the CRS system, which is closer to the optics of an optical pen of the CRS system along the distance measurement optical axis (Z axis), than in the red part (i.e., red light wavelengths part) of the Z range, as illustrated in the examples of FIGS. 10D-10F. Thus, one possible technique to provide some amount of improvement in relation to the merging issue is to place a workpiece to be measured in the red part of the Z range of the CRS system (i.e., at a sufficient distance from the optical pen). Also, as best shown in FIG. 10G, another technique to provide some amount of improvement in relation to the wavelength peaks merging issue is to set a higher signal level threshold (e.g., Threshold B) to thereby isolate and detect two peaks, as opposed to a lower signal level threshold (e.g., Threshold A) which does not isolate the two peaks and thus can detect only one (merged) peak. Certain related concepts will also be described in more detail below with respect to FIG. 5A. Such techniques have certain limitations (e.g., it is not always easy to place a particular workpiece in the red part of the Z range of the CRS system, more signal levels become undetectable when a detection threshold is set too high, etc.).

Various aspects of the present invention are directed to providing improvements with respect to such issues. One aspect of the invention is to achieve more accurate thickness measurements (e.g., for smaller thicknesses where wavelength peak merging may be present, and over an increased range of possible distances between the optical pen and the workpiece, etc.).

According to embodiments of the present invention, a chromatic range sensor (CRS) system configured to determine a workpiece thickness is provided. The CRS system includes:

an optical pen comprising a confocal optical path including an optics portion providing axial chromatic dispersion and configured to focus different wavelengths at different distances proximate to a workpiece;

an illumination source configured to generate multi-wavelength input light comprising an input spectral profile that is input to the optical pen;

a CRS wavelength detector comprising a plurality of pixels with respective pixel positions distributed along a measurement axis of the CRS wavelength detector, wherein the CRS system is configured such that, when the optical pen is operably positioned relative to the workpiece to perform measurement operations, the optical pen inputs the input spectral profile and outputs corresponding radiation to first and second workpiece surfaces of the workpiece and receives reflected radiation from the first and second workpiece surfaces and outputs the reflected radiation to the CRS wavelength detector which provides output spectral profile data; and a processing portion configured to process the output spectral profile data to determine a thickness of the workpiece which corresponds to a spacing between the first and second workpiece surfaces of the workpiece, wherein the processing to determine the thickness comprises utilization of transform processing.

According to one aspect, the transform processing comprises at least one of Fourier transform processing or Fourier-related transform processing. The utilization of the transform processing includes: determining a transform of the output spectral profile data; and determining the thickness of the workpiece based at least in part on a first characteristic of the transform of the output spectral profile data. According to another aspect, the first characteristic corresponds to a first dip of the transform of the output spectral profile data.

According to another aspect, the output spectral profile data comprises distance-dependent profile components having first and second wavelength peaks that correspond to the first and second workpiece surfaces, respectively, and the determining of the thickness of the workpiece is not dependent on processing the output spectral profile data to determine corresponding first and second measurement distances to the first and second workpiece surfaces. According to a further aspect, the first and second wavelength peaks visually appear as a single peak in a representation of the output spectral profile data that is provided by the CRS wavelength detector.

According to another aspect, for a workpiece having a spacing between the first and second workpiece surfaces of 5 microns, the utilization of the transform processing enables the processing portion to accurately determine the thickness of the workpiece with less than 10 percent error.

According to another aspect, the processing portion is further configured to process the output spectral profile data to determine a measurement distance to the workpiece. According to a further aspect, the processing to determine the measurement distance to the workpiece comprises processing the output spectral profile data to determine a centroid that is indicative of the measurement distance to the workpiece, while the processing to determine the thickness of the workpiece is not dependent on a determination of the centroid. According to a further aspect, the determined measurement distance is to a point inside the workpiece that is between the first and second workpiece surfaces. According to a still further aspect, the determined measurement distance is determined according to a distance indicating coordinate that corresponds to an average of first and second wavelength peaks that correspond to the respective first and second workpiece surfaces. According to a further aspect, the processing portion is further configured to utilize the determined measurement distance and the determined thickness of the workpiece to determine at least one of the first measurement distance to the first workpiece surface or the second measurement distance to the second workpiece surface.

According to another aspect, the utilization of the transform processing comprises:

determining a Fourier transform of the output spectral profile data;

dividing the Fourier transform of the output spectral profile data by a Fourier transform of a reference to obtain a Fourier transform of target spectral profile data;

computing an inverse Fourier transform of the Fourier transform of the target spectral profile data to determine first and second wavelength peaks which correspond to respective first and second measurement distances to the first and second workpiece surfaces; and determining the thickness of the workpiece based at least in part on a difference between the respective measurement distances to the first and second workpiece surfaces.

According to yet another aspect, the CRS system is operable in a plurality of modes including a thickness measurement mode, for which the processing portion performs the processing to determine the thickness as part of the thickness measurement mode. According to a further aspect, the plurality of modes further include a distance measurement mode for measuring a distance to a workpiece; the CRS system is configured such that, during the distance measurement mode, when the optical pen is operably positioned relative to the workpiece to perform measurement operations, the optical pen inputs the input spectral profile and outputs corresponding radiation to the workpiece and receives reflected radiation from the workpiece and outputs the reflected radiation to the CRS wavelength detector which provides the output spectral profile data; and the output spectral profile comprises a distance-dependent profile component having a wavelength peak that indicates a measurement distance to the workpiece. According to a further aspect, the thickness measurement mode is only operable to determine thicknesses as corresponding to spacings between first and second workpiece surfaces and is not operable to determine spacings between three or more workpiece surfaces.

According to another aspect, the CRS system is at least one of a chromatic point sensor system or a chromatic line sensor system.

According to another aspect, a method is provided for operating a chromatic range sensor (CRS) system to determine a workpiece thickness. The CRS system includes: an optical pen comprising a confocal optical path including an optics portion providing axial chromatic dispersion and configured to focus different wavelengths at different distances proximate to a workpiece; an illumination source configured to generate multi-wavelength input light comprising an input spectral profile that is input to the optical pen; and a CRS wavelength detector comprising a plurality of pixels with respective pixel positions distributed along a measurement axis of the CRS wavelength detector, the plurality of pixels receiving respective wavelengths and providing output spectral profile data. The method includes:

operating the CRS system with the optical pen operably positioned relative to the workpiece to perform measurement operations, the measurement operations including the optical pen inputting the input spectral profile and outputting corresponding radiation to first and second workpiece surfaces of the workpiece and receiving reflected radiation from the first and second workpiece surfaces and outputting the reflected radiation to the CRS wavelength detector which provides the output spectral profile data, and processing the output spectral profile data to determine a thickness of the workpiece which corresponds to a spacing between the first and second workpiece surfaces of the workpiece, wherein the processing to determine the thickness comprises utilization of transform processing.

According to another aspect, a method is provided for operating a chromatic range sensor (CRS) system. The CRS system includes: an optical pen comprising a confocal optical path including an optics portion providing axial chromatic dispersion and configured to focus different wavelengths at different distances proximate to a workpiece; an illumination source configured to generate multi-wavelength input light comprising an input spectral profile that is input to the optical pen; and a CRS wavelength detector comprising a plurality of pixels with respective pixel positions distributed along a measurement axis of the CRS wavelength detector, the plurality of pixels receiving respective wavelengths and providing output spectral profile data. The method includes:

operating the CRS system with the optical pen operably positioned relative to the workpiece to perform measurement operations, the measurement operations including the optical pen inputting the input spectral profile and outputting corresponding radiation to first and second workpiece surfaces of the workpiece and receiving reflected radiation from the first and second workpiece surfaces and outputting the reflected radiation to the CRS wavelength detector which provides the output spectral profile data;

processing the output spectral profile data to determine a measurement distance to the workpiece, wherein the processing to determine the measurement distance includes determining a distance indicating coordinate corresponding to a pixel position of the CRS wavelength detector that indicates the measurement distance; and processing the output spectral profile data to determine a thickness of the workpiece which corresponds to a spacing between the first and second workpiece surfaces of the workpiece, wherein the processing to determine the thickness is not dependent on a determined measurement distance to the workpiece.

BRIEF DESCRIPTION OF THE SEVERAL VIEWS OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
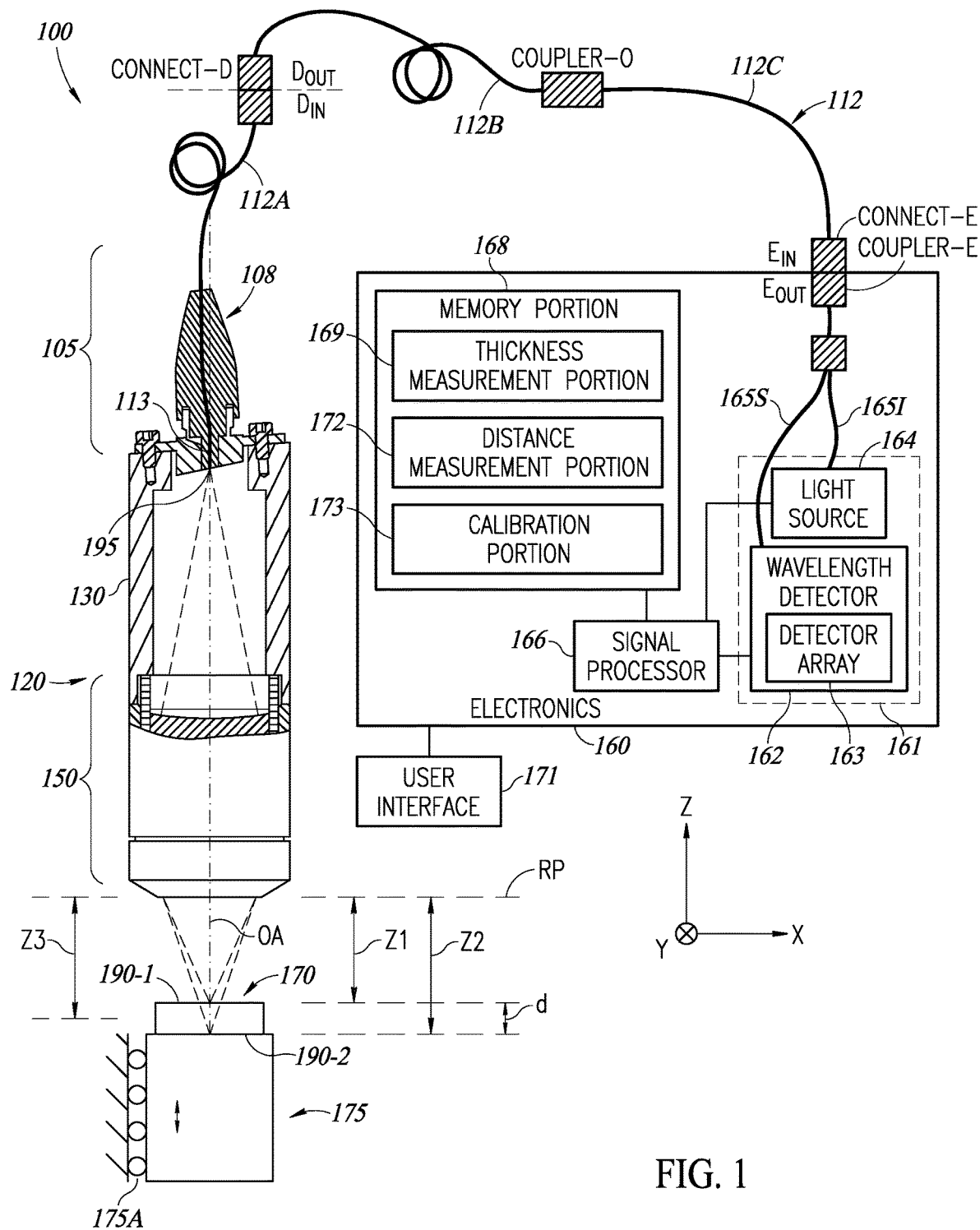
FIG. 1 is a block diagram of one embodiment of an exemplary CRS system.

FIG. 1 is a block diagram of one exemplary embodiment of a chromatic range sensor (CRS) system 100, including an optical element 120 (e.g., an optical pen), an electronics portion 160, and a user interface portion 171. The embodiment of the electronics portion 160 includes a signal processor 166, a memory portion 168 and a source and detector subsystem 161 comprising a wavelength detector 162 and a broadband light source 164. The CRS system 100 shown in FIG. 1 is a chromatic point sensor (CPS) system which measures a single measurement point at a time, although it will be appreciated that in other implementations other sensor systems (e.g., a chromatic line sensor, etc.) may be utilized. In various embodiments, the wavelength detector 162 includes a detector array 163 of a spectrometer. The detector array 163 may comprise a plurality of pixels distributed along a measurement axis of the wavelength detector 162, wherein the respective pixels receive respective wavelength signals and provide corresponding output spectral profile data.

The electronics portion 160 is coupled to the optical element 120 through an optical path including a fiber optic cable 112. Optional or alternative aspects of the optical path are shown, including the fiber optic cable 112 having first and second segments 112A and 112B joined at a connector CONNECT-D in the fiber optic segment 112B, and a coupler COUPLER-O which joins the segment 112B to a segment 112C which is coupled to the electronics portion 160. The light source 164, which is controlled by the signal processor 166, is connected to input multi-wavelength light comprising an input spectral profile to the optical element 120 through a path including the illumination fiber segment 165I, the 2×1 coupler COUPLER-E, CONNECT-E, and the fiber optic cable 112. The optical element 120 includes an in/out fiber optic sub-assembly 105, a housing 130, and an optics portion 150. The in/out fiber optic sub-assembly 105 comprises an in/out optical fiber 113 carried through the fiber optic cable 112, and a fiber optic connector 108. The in/out optical fiber 113 outputs an output beam through an aperture 195, and receives reflected measurement signal light through the aperture 195.

In operation, light emitted from the fiber end through the aperture 195 is focused by the optics portion 150, which includes a lens that provides an axial chromatic dispersion such that the focal point along the optical axis OA is at different distances depending on the wavelength of the light, as is known for CRS systems. During measurement operations, the light is focused proximate to a workpiece 170 which has first and second workpiece surfaces 190-1 and 190-2 (i.e., top and bottom workpiece surfaces). In various implementations, the workpiece 170 may be transparent or otherwise include material such that the bottom surface 190-2 may be at least partially visible through the top surface 190-1 (i.e., some of the light from the optical element 120 is able to pass through the top surface 190-1 to reach the bottom surface 190-2). For purposes of simplicity in the following description, a scenario is initially described in which the workpiece 170 is non-transparent or otherwise has characteristics such that only the top surface 190-1 reflects light to the CRS system 100.

In an implementation where only the top surface 190-1 is reflecting light, during measurement operations the light is focused by the optics portion 150 on the top surface 190-1 (i.e., as opposed to light also being focused on the bottom surface 190-2, such as will be described with respect to other examples below). Light reflected from the top surface 190-1 is refocused by the optics portion 150 onto the aperture 195. Due to its axial chromatic dispersion, only one wavelength will have the focus distance that matches the measurement distance "Z1", which is the distance from a reference position RP that is fixed relative to the optical element 120 to the location on the workpiece surface 190-1. The wavelength that is best focused at the location on the workpiece surface 190-1 is the best focused wavelength at the aperture 195. Thus, predominantly the best focused wavelength passes through the aperture 195 and into the core of the optical fiber 113 of the fiber optic cable 112. The fiber optic cable 112 routes the signal light to the wavelength detector 162 that is utilized for determining the wavelength having the dominant intensity, which corresponds to the measurement distance Z1 to the location on the workpiece surface 190-1.

In the illustrated embodiment, the reflected wavelength-dependent light intensity passes back to the electronics portion 160 through the fiber optic path including the coupler COUPLER-E such that a percentage (e.g., in some implementations approximately 50%) of the light is directed through the signal fiber segment 165S to the wavelength detector 162. The wavelength detector 162 receives the wavelength-dependent light intensity as an output spectral intensity profile (also referred to simply as an output spectral profile) distributed over an array of pixels along a measurement axis of the detector array 163, and operates to provide corresponding output spectral profile data based on pixel data output from the detector array 163.

The subpixel-resolution distance-indicating coordinate (DIC) of the profile data (e.g., see FIG. 3) is calculated by the signal processor 166, and the DIC (in subpixels) indicates the measurement distance Z1 to the location on the workpiece surface 190-1 (in microns) via a distance calibration lookup table or the like, which is stored in a calibration portion 173 of the memory portion 168, as described below with respect to FIGS. 4A and 4B. In accordance with previously known methods, the DIC may be determined in accordance with the centroid of the intensity profile data included in a peak region. In various implementations, the profile data may be used to determine the DIC with subpixel resolution as described in more detail below.

It will be appreciated that in an implementation where the workpiece 170 is transparent, similar operating principles as those described above may apply with respect to the determination of measurement distances to the workpiece surfaces 190-1 and 190-2. More specifically, during measurement operations, light is focused by the optics portion 150 on the workpiece surfaces 190-1 and 190-2 (i.e., for which some of the light passes through the workpiece surface 190-1 to reach the workpiece surface 190-2). Light reflected from the workpiece surfaces 190-1 and 190-2 is refocused by the optics portion 150 onto the aperture 195. Due to its axial chromatic dispersion, only one wavelength will have the focus distance that matches the measurement distance "Z1", which is the distance from a reference position RP that is fixed relative to the optical element 120 to the location on the workpiece surface 190-1, and similarly only one wavelength will have the focus distance that matches the measurement distance "Z2", which is the distance from the reference position RP to the location on the workpiece surface 190-2. The wavelengths that are best focused at the locations on the workpiece surfaces 190-1 and 190-2 are the best focused wavelengths at the aperture 195. Thus, predominantly the best focused wavelengths pass through the aperture 195 and into the core of the optical fiber 113 of the fiber optic cable 112. The fiber optic cable 112 routes the signal light to a wavelength detector 162 that is utilized for determining the wavelengths having the dominant intensities, which correspond to measurement distances to the respective locations on the workpiece surfaces 190-1 and 190-2. As will be described in more detail below with respect to FIG. 5B, due to the index of refraction of the workpiece material, in various implementations, the indicated measurement distance to the workpiece surface 190-2 may be an apparent measurement distance Z2', which is related to the measurement distance Z2 (e.g., as illustrated by EQUATIONS 3-5, etc.).

In the illustrated embodiment, the reflected wavelength-dependent light intensity passes back to the electronics portion 160 through the fiber optic path including the coupler COUPLER-E such that a percentage (e.g., in some implementations approximately 50%) of the light is directed through the signal fiber segment 165S to the wavelength detector 162. The wavelength detector 162 receives the wavelength-dependent light intensity as an output spectral intensity profile (also referred to simply as an output spectral profile) distributed over an array of pixels along a measurement axis of the detector array 163, and operates to provide corresponding output spectral profile data based on pixel data output from the detector array 163.

The two corresponding subpixel-resolution distance-indicating coordinates (DICs) of the profile data (e.g., see FIG. 5A) are calculated by the signal processor 166, and the two DICs (in subpixels) indicate respective measurement distances (in microns) via a distance calibration lookup table or the like, which is stored in the calibration portion 173 of the memory portion 168, as described below with respect to FIGS. 4A and 4B. In accordance with previously known methods, the two DICs may be determined in accordance with the centroid of the intensity profile data included in each of the two corresponding peak regions. In various implementations, the profile data may be used to determine each of the two DICs with subpixel resolution as described in more detail below. In various implementations, a DIC may also or alternatively be determined (e.g., resulting from a centroid calculation of two merged wavelength peaks) which corresponds to an apparent measurement distance Z3', which is related to an actual measurement distance Z3 (e.g., as illustrated by EQUATIONS 6-10, etc.). As will be described in more detail below, the distance Z3 may be between the distances Z1 and Z2 and may correspond to a distance to a position inside the workpiece 170, such as at a midpoint between the workpiece surfaces 190-1 and 190-2.

As further illustrated in FIG. 1, the user interface portion 171 is coupled to the electronics portion 160 and is configured to receive user input used for the operation of the CRS system 100, such as a user command to select various operating parameters, via any suitable means such as a keyboard, touch sensor, mouse, etc. In exemplary embodiments, the user interface portion 171 may include one or more operation mode selecting elements (e.g., user-selectable buttons) operable by a user to select one of a plurality of operation modes of the CRS system 100 (e.g., such as a thickness measurement mode and/or a distance measurement mode, etc.). The user interface portion 171 is also configured to display information on a screen, such as a distance and/or thickness successfully determined/measured by the CRS system 100. As will be described in more detail below, in various implementations, the memory portion 168 may include a thickness measurement portion 169 and a distance measurement portion 172, such as may implement corresponding modes and/or otherwise provide corresponding operations. Such corresponding modes and/or operations may be for measuring thicknesses of workpieces (e.g., as corresponding to a spacing between first and second workpiece surfaces) and/or distances to workpiece surfaces, etc. In various implementations, the thickness measurement portion 169 and the distance measurement portion 172 and/or the operations associated therewith may be merged and/or otherwise indistinguishable.

FIG. 1 includes orthogonal XYZ coordinate axes, as a frame of reference. The Z direction is defined to be parallel to the optical axis (OA), which is the distance-measurement axis, of the optical element 120. As illustrated in FIG. 1, during operation, the workpiece 170 is placed along the optical axis OA, and may be mounted on a translation stage 175 which may be advantageously aligned such that it translates along the Z axis direction constrained by guide bearings 175A.

Figure 2:
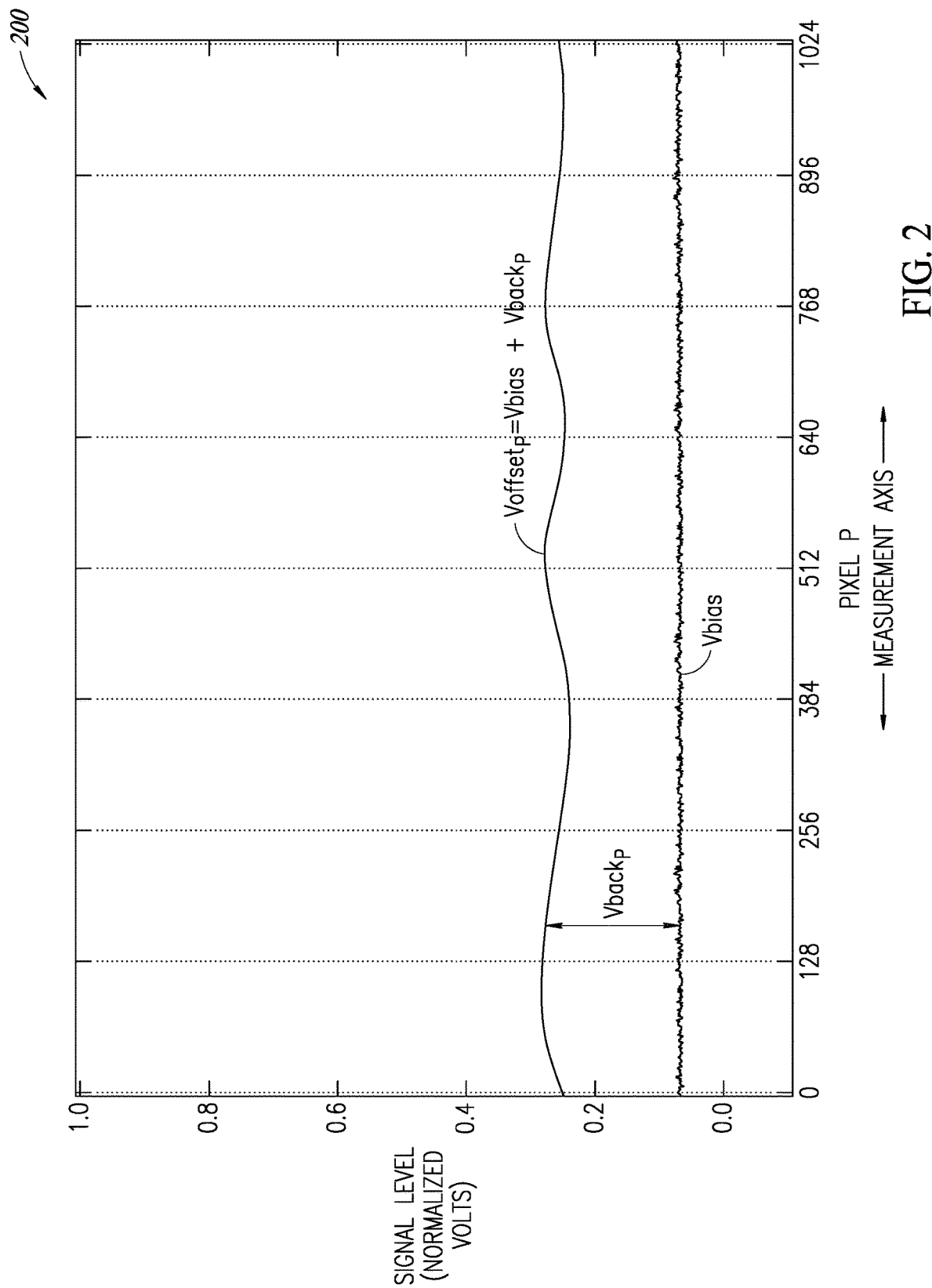
FIG. 2 is a diagram of a system noise (bias) profile from a CRS system illustrating wavelength-dependent voltage offset signal levels for the pixels in a detector array when no measurement surface is present.

The following description of FIG. 2 outlines certain known background signal processing and/or calibration operations. FIG. 2 is a diagram 200 of a system noise (bias) profile from a CRS system, illustrating voltage offset signal levels Voffset(p) for the pixels in a detector array 163 when no measurement surface is present within the nominal total measurement range of the CRS system. In such a case, there is no intentionally reflected light and hence no significant or dominant wavelength peak in the resulting intensity profile. The voltage offset signal Voffset(p) is plotted in normalized volts, for each of 1,024 pixels along the "wavelength" measurement axis. "Normalized volts" assigns a value of 1.0 to the saturation voltage of the detector array 163. The voltage offset signal Voffset(p) includes a bias signal level Vbias, which is relatively consistent across the detector array, and a background signal component Vback(p), which is shown as varying across the detector array.

The following description of FIGS. 3, 4A, 4B, 5A and 5B outlines certain signal processing operations that determine distance-indicating coordinates (DIC) with subpixel resolution based on valid wavelength peaks produced in wavelength-dispersed intensity profiles from the CRS system and determine measurement distances to workpiece surfaces (e.g., in microns) based on the determined DICs. Certain of the operations outlined here are described in more detail in the '456 patent. The purpose of this description is to provide additional background information which is useful for an overall understanding of certain CRS measurement operations as described herein.

Figure 3:
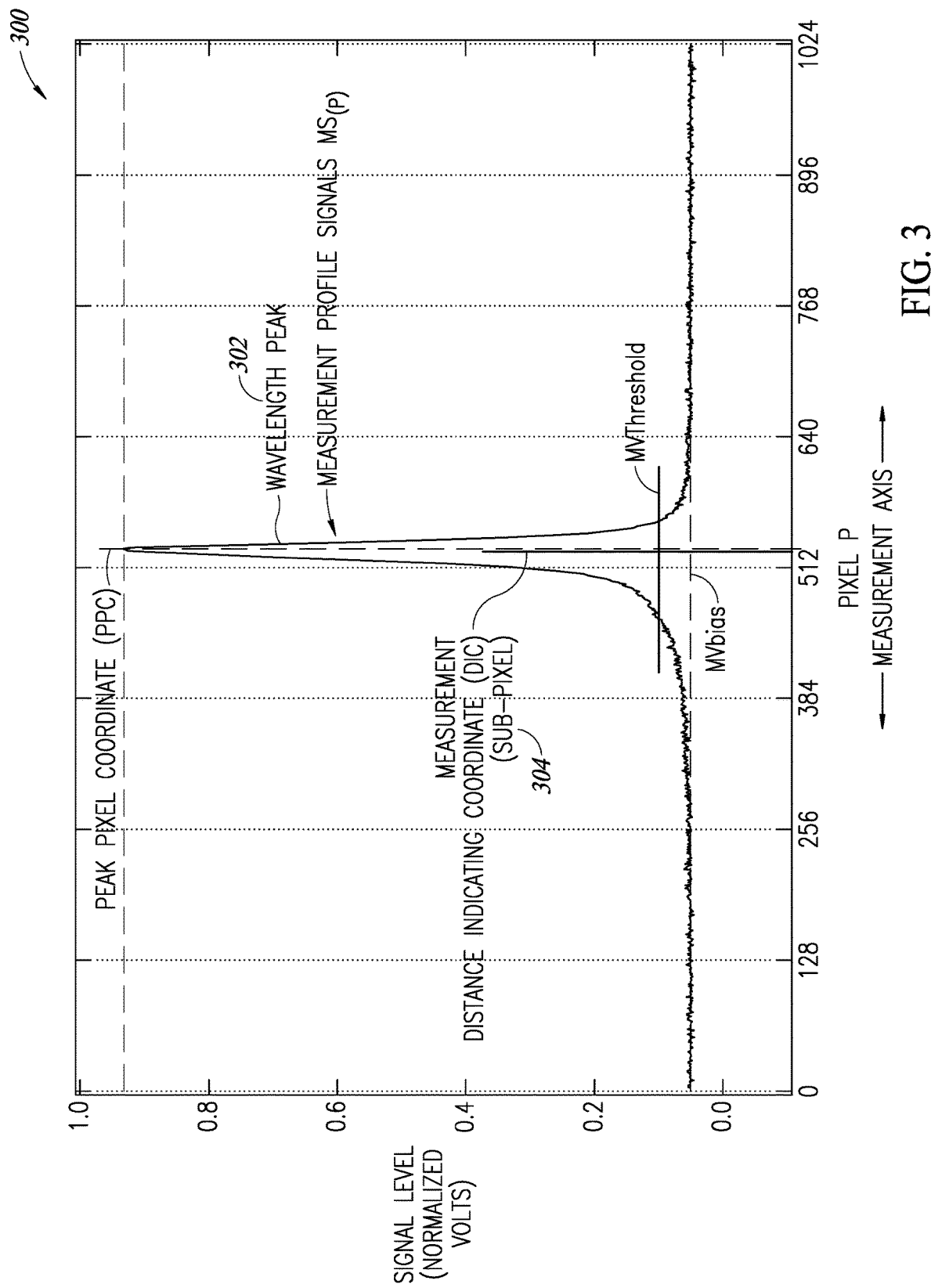
FIG. 3 is a diagram of an intensity profile from a CRS system illustrating a valid wavelength peak produced by a wavelength reflected by a top surface of a workpiece (e.g., a non-transparent workpiece), wherein the pixel position of the peak corresponds to a measurement distance to the top surface.

FIG. 3 is a diagram 300 of a wavelength-dispersed intensity profile from a CRS system illustrating a valid wavelength peak 302 produced by a subset of measurement profile signals MS(p) indicative of a wavelength focused on and reflected by a single measurement surface of a workpiece (e.g., that is not transparent). In this example, the diagram 300 includes a single wavelength peak 302 corresponding to a single reflection surface (e.g., the top surface) of a non-transparent workpiece. Each of the measurement profile signals MS(p) has the signal level (shown in normalized volts) associated with each pixel p of the detector array (e.g., the detector array 163). The wavelength peak 302 has more than sufficient height (a good signal to noise ratio), is relatively symmetric, and allows a good estimation of the peak location or measurement distance-indicating coordinate (DIC) 304 along the measurement axis of the detector array. FIG. 3 also shows a bias signal level MVbias (in normalized volts), a peak pixel coordinate (ppc), and a data threshold MVthreshold that defines the lower limit of a distance-indicating subset of measurement profile signals MS(p) forming the wavelength peak 302. All values (e.g., including "MV" values) are in normalized volts.

Briefly, in one embodiment, measurement operations for determining a distance-indicating coordinate (DIC) (in pixels) and determining a corresponding measurement distance (in microns) based on the determined DIC may include the following:

Position the target surface along the optical axis OA, and capture the resulting wavelength-dispersed intensity profile as in the diagram 300.

Determine the peak pixel coordinate (ppc), which is the pixel that has the highest signal.

Determine the measurement bias signal level MVbias at a given sampling rate.

Determine the data threshold MVthreshold (e.g., as a percentage of the peak height).

Determine the distance-indicating coordinate (DIC) with sub-pixel resolution, based on the distance-indicating subset of measurement profile signals MS(p) forming the wavelength peak that has a value greater than MVthreshold.

Figure 4A:
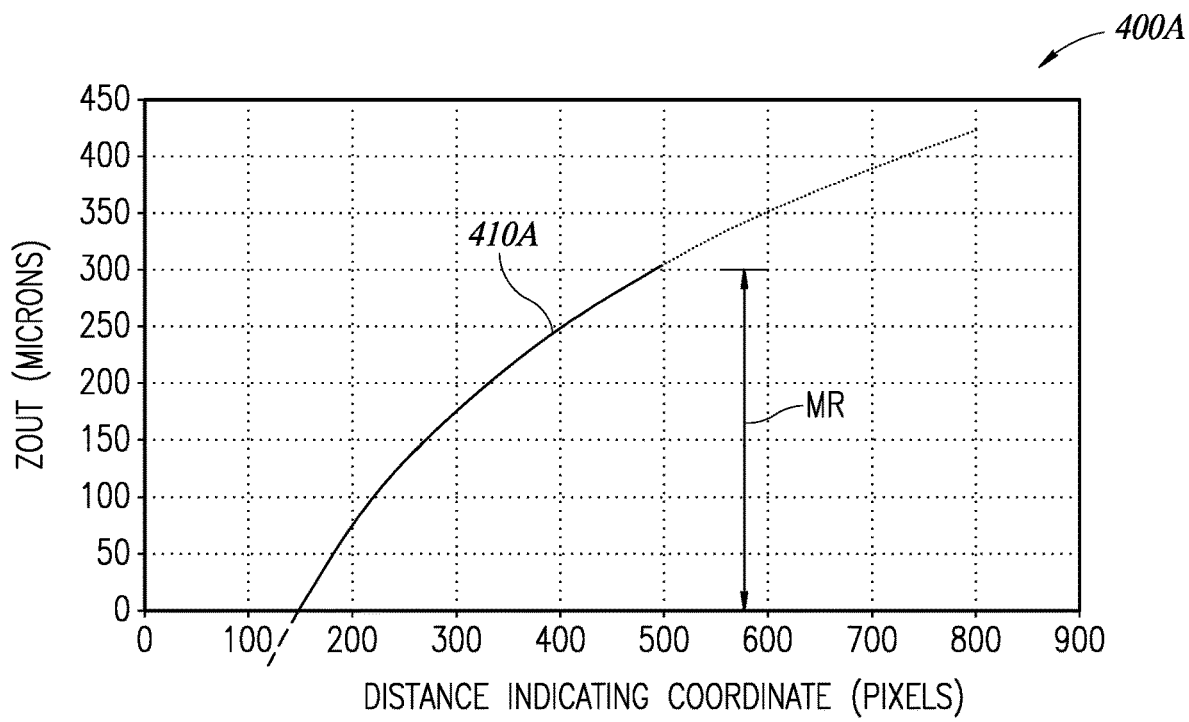
FIG. 4A is a diagram of CRS distance calibration data, which correlates distance-indicating pixel coordinates with known measurement distances to a measured workpiece surface.
Figure 4B:
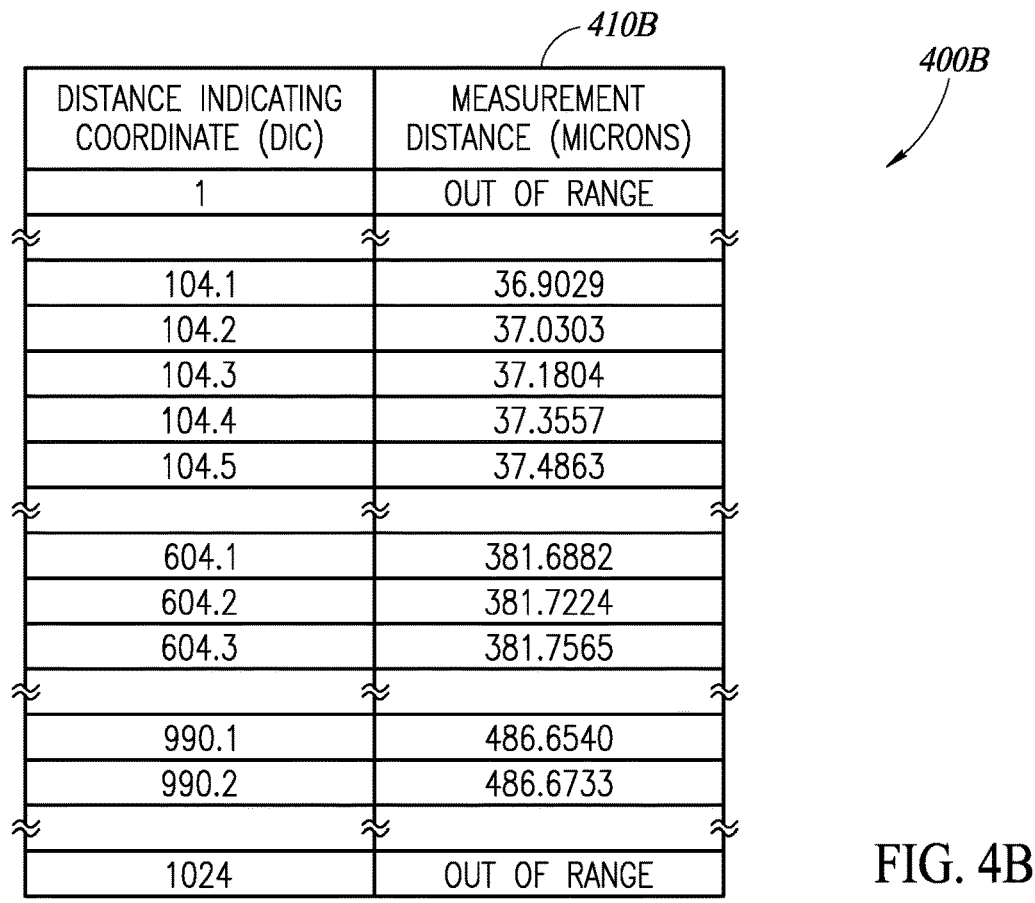
FIG. 4B is an example CRS distance calibration lookup table, which references distance-indicating coordinates (DIC) to corresponding measurement distances of a CRS system.

Determine the measurement distance by correlating the DIC with a corresponding distance in the stored distance calibration data (e.g., a distance calibration curve as in FIG. 4A or a lookup table as in FIG. 4B, etc.).

In the foregoing operations, a DIC may be determined with sub-pixel resolution, based on the distance-indicating subset of measurement profile signals MS(p) above the data threshold MVthreshold. In accordance with previously known methods, a DIC may be determined as the subpixel-resolution coordinate of a centroid Xc of the distance-indicating subset of signals MS(p). For example, for a detector with 1024 pixels (i.e., each having a corresponding pixel number (p) from 1 to 1024), the centroid Xc may be determined according to:

$$Xc = \frac{\sum_{p=1}^{1024} p(S_M(p))^n}{\sum_{p=1}^{1024} (S_M(p))^n} \quad \text{(Eq. 1)}$$

where, $$S_M(p) = \quad \text{(Eq. 2)}$$
$$\begin{cases} MS_p - MVThreshold(ppc), & \text{for } MS_p \geq MVThreshold(ppc) \\ 0, & \text{for } MS_p < MVTThreshold(ppc) \end{cases}$$

In one specific example, n=2 in EQUATION 1. It will be appreciated that EQUATION 2 restricts the signals MS(p) used in the centroid calculation to a distance-indicating subset.

FIG. 4A is a diagram 400A of CRS measurement distance calibration data 410A which correlates distance-indicating coordinates (DIC) with sub-pixel resolution to known measurement distances (ZOUT) in microns along the optical axis (OA) of the CRS (e.g., as stored in the calibration portion 173 of FIG. 3). It will be appreciated that the specific values of FIG. 4A are intended to be illustrative only, and may not correspond to specific values indicated in other examples (e.g. in relation to certain values described with respect to FIGS. 1-3 and/or the specific table values of FIG. 4B as will be described in more detail below, although it will be appreciated that the concepts are analogous). The example shown in FIG. 4A is for an optical element (e.g., optical pen) having a nominal total measurement range MR of 300 microns, which corresponds to DICs in the range of approximately 150 pixels-490 pixels. However, the CRS system may be calibrated over a larger pixel range of the detector array 163, if desired. One exemplary laboratory calibration method to determine the CRS measurement distance calibration data 410A employs a mirror (e.g., substituting for the surface 190-1 of FIG. 1) moved along the optical axis OA (e.g., in approximately 0.1 or 0.2 micron steps). For each actual mirror position, the corresponding calibration DIC of the CRS system is determined based on the corresponding intensity profile data as described above with respect to FIG. 3. The calibration DIC and the corresponding actual position (in microns along the optical axis OA) are then recorded to provide the calibration data 410A. During a workpiece measurement operation (e.g., for determining a measurement distance to a workpiece surface, such as workpiece surface 190-1), a measurement DIC obtained by a CRS system is referenced to the stored calibration data 410A to determine the measurement distance ZOUT corresponding to the measurement DIC. Although the distance calibration data 410A appears to form a smooth curve, it will be appreciated that in some instances the distance calibration data and/or output spectral profile data for a typical CRS system, particularly for economical CRS systems, may exhibit certain short range variations/irregularities (e.g., as described in part in U.S. Pat. No. 7,876,456, which is hereby incorporated herein by reference in its entirety).

FIG. 4B is a diagram 400B of a CRS distance calibration lookup table 410B for referencing distance-indicating coordinates to measurement distances for a chromatic point sensor (e.g., as stored in the calibration portion 173 of FIG. 3). As noted above, it will be appreciated that the table values of FIG. 4B are intended to be illustrative only, and may not correspond to specific values indicated in other examples, such as those of FIG. 4A, although for which it will be appreciated that the concepts are analogous. In FIG. 4B, in the left column the calibration DICs entries cover the pixel coordinates from 1 to 1,024, in increments of 0.1 pixel steps, and in the right column the corresponding measurement distances (in microns) (ZOUT) are entered. In operation, the measurement DIC calculated by the CRS system is referenced to the stored calibration lookup table in order to determine the corresponding measurement distance (in microns). If the measurement DIC falls between adjacent calibration DIC values, then the measurement distance may be determined by interpolation. In the example of FIG. 4B, some specific example values are shown for some small ranges near DICs with pixel positions of approximately 104, 604 and 990, with corresponding measurement distances in ranges near 37 microns, 381 microns and 486 microns.

In operation (e.g., for a distance measurement to a single workpiece surface 190-1 as illustrated in FIG. 3), the optical pen 120 is connected to the CRS electronics portion 160 and operably positioned relative to the workpiece surface 190-1 to perform measurement operations. The measurement operations include the optical pen 120 inputting an input spectral profile from the illumination source 164 and outputting corresponding radiation to the workpiece surface 190-1 and receiving reflected radiation from the workpiece surface 190-1 and outputting the reflected radiation to provide an output spectral profile to the CRS wavelength detector 162, which then provides output spectral profile data. The output spectral profile includes a distance-dependent profile component and a distance-independent profile component. The distance-dependent profile component has a wavelength peak (e.g., peak 302 in FIG. 3) that indicates a measurement distance (e.g., measurement distance Z1) from the optical pen 120 to the workpiece surface 190-1. As described above, the measurement DIC that is determined in accordance with a centroid calculation by the CRS system is referenced to the stored calibration data (e.g., FIG. 4A or 4B)

in order to determine the measurement distance (e.g., measurement distance Z1) corresponding to the measurement DIC. If the measurement DIC falls between adjacent calibration DIC values, then the measurement distance corresponding to the measurement DIC may be determined by interpolation (e.g., between the measurement distances corresponding to the adjacent calibration DIC values).

Figure 5A:
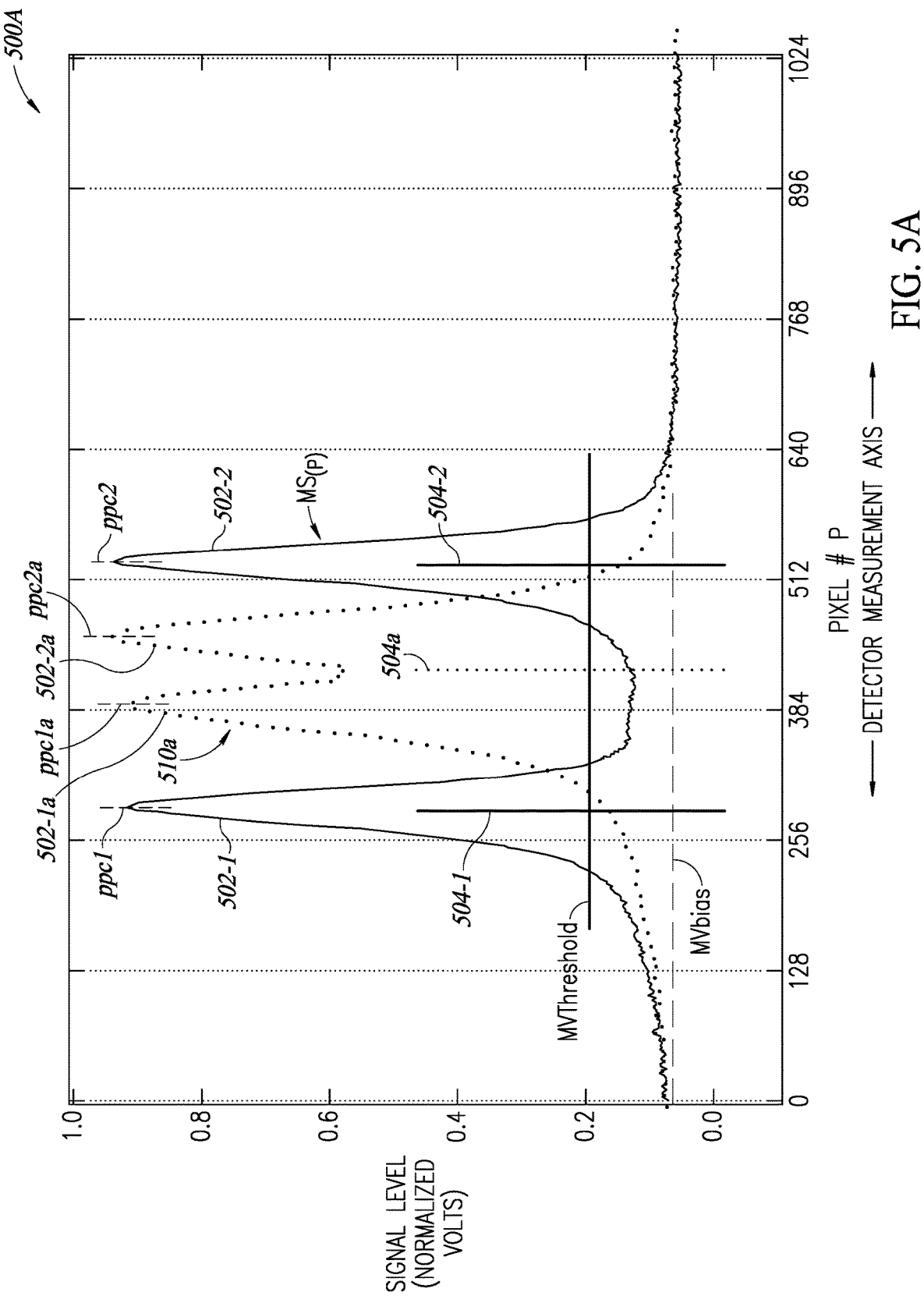
FIG. 5A is a diagram of an intensity profile from a CRS system illustrating two valid wavelength peaks produced by wavelengths reflected by top and bottom surfaces of a transparent workpiece, wherein the pixel positions of the peaks correspond to measurement distances to the surfaces.

In contrast to the example of FIG. 3 that is in relation to determining a measurement distance to a single workpiece surface, as will be described in more detail below, FIG. 5A illustrates an example for determining measurement distances to first and second workpiece surfaces (e.g., measurement distances Z1 and Z2 to top and bottom workpiece surfaces 190-1 and 190-2, respectively, of FIG. 1). Such techniques (e.g., which are sometimes referenced as "centroid type techniques" herein) may be utilized to determine a thickness of a workpiece (e.g., based at least in part on a difference between measurement distances Z1 and Z2' as corresponding to DICs determined from centroid calculations). However, as will be described in more detail below (e.g., in particular with respect to FIGS. 6-9H), in accordance with principles disclosed herein, certain alternative techniques may be utilized for determining a workpiece thickness, which have certain advantages (e.g., including more accurate thickness determinations for certain workpieces, etc.).

FIG. 5A is a diagram 500A of a wavelength-dispersed intensity profile from a CRS system illustrating valid wavelength peaks 502-1 and 502-2. The wavelength peak 502-1 is produced by a first subset of measurement profile signals MS(p) indicative of a first wavelength focused on and reflected by a first measurement surface (e.g., surface 190-1 of workpiece 170). The valid wavelength peak 502-2 is produced by a second subset of measurement profile signals MS(p) indicative of a second wavelength focused on and reflected by a second measurement surface (e.g., surface 190-2 of workpiece 170). In this example, the workpiece (e.g., workpiece 170) may be transparent, thus allowing the second measurement surface 190-2 to be viewed through the first measurement surface 190-1 (e.g., for which some of the light from the optical pen 120 passes through the first measurement surface 190-1 to be reflected by the second measurement surface 190-2).

Each of the measurement profile signals MS(p) has the signal level (shown in normalized volts) associated with each pixel p of the detector array (e.g., the detector array 163). Each of the valid wavelength peaks 502-1 and 502-2 has more than sufficient height (a good signal to noise ratio), is relatively symmetric, and allows a good estimation of the respective peak location and a determination of a distance-indicating coordinate (DIC) 504-1 or 504-2 (i.e., utilizing a centroid calculation) along the measurement axis of the detector array. FIG. 5A shows a bias signal level MVbias (in normalized volts), peak pixel coordinates (ppc1 and ppc2), and a data threshold MVthreshold that defines the lower limit of a distance-indicating subset of measurement profile signals MS(p) forming the corresponding wavelength peaks 502-1 and 502-2. All values (e.g., including "MV" values) are in normalized volts.

In operation (e.g., for the two workpiece surface measurements), the optical pen 120 is connected to the CRS electronics portion 160 and operably positioned relative to the workpiece 170 (i.e., including the workpiece surfaces 190-1 and 190-2) to perform measurement operations. The measurement operations include the optical pen 120 inputting an input spectral profile from the illumination source 164 and outputting corresponding radiation to the workpiece surfaces 190-1 and 190-2 and receiving reflected radiation from the workpiece surfaces 190-1 and 190-2 and outputting the reflected radiation to provide an output spectral profile to the CRS wavelength detector 162, which then provides output spectral profile data. The output spectral profile includes distance-dependent profile components and distance-independent profile components. The distance-dependent profile components have wavelength peaks (e.g., peaks 502-1 and 502-2 in FIG. 5A) that indicate measurement distances from the optical pen 120 to the workpiece surfaces 190-1 and 190-2, respectively. As described above, the measurement DICs 504-1 and 504-2 calculated by the CRS system (i.e., using a centroid calculation) are referenced to the stored calibration data (e.g., FIG. 4A or 4B) in order to determine the measurement distances (e.g., measurement distances Z1 and Z2') corresponding to the measurement DICs. If either or both of the measurement DICs falls between adjacent calibration DIC values, then the measurement distance corresponding to the measurement DIC may be determined by interpolation. In various implementations, and in accordance with previously known techniques, a thickness d of the workpiece 170 may be determined in accordance with a difference between the determined measurement distances, as will be described in more detail below with respect to FIG. 5B.

Figure 5B:
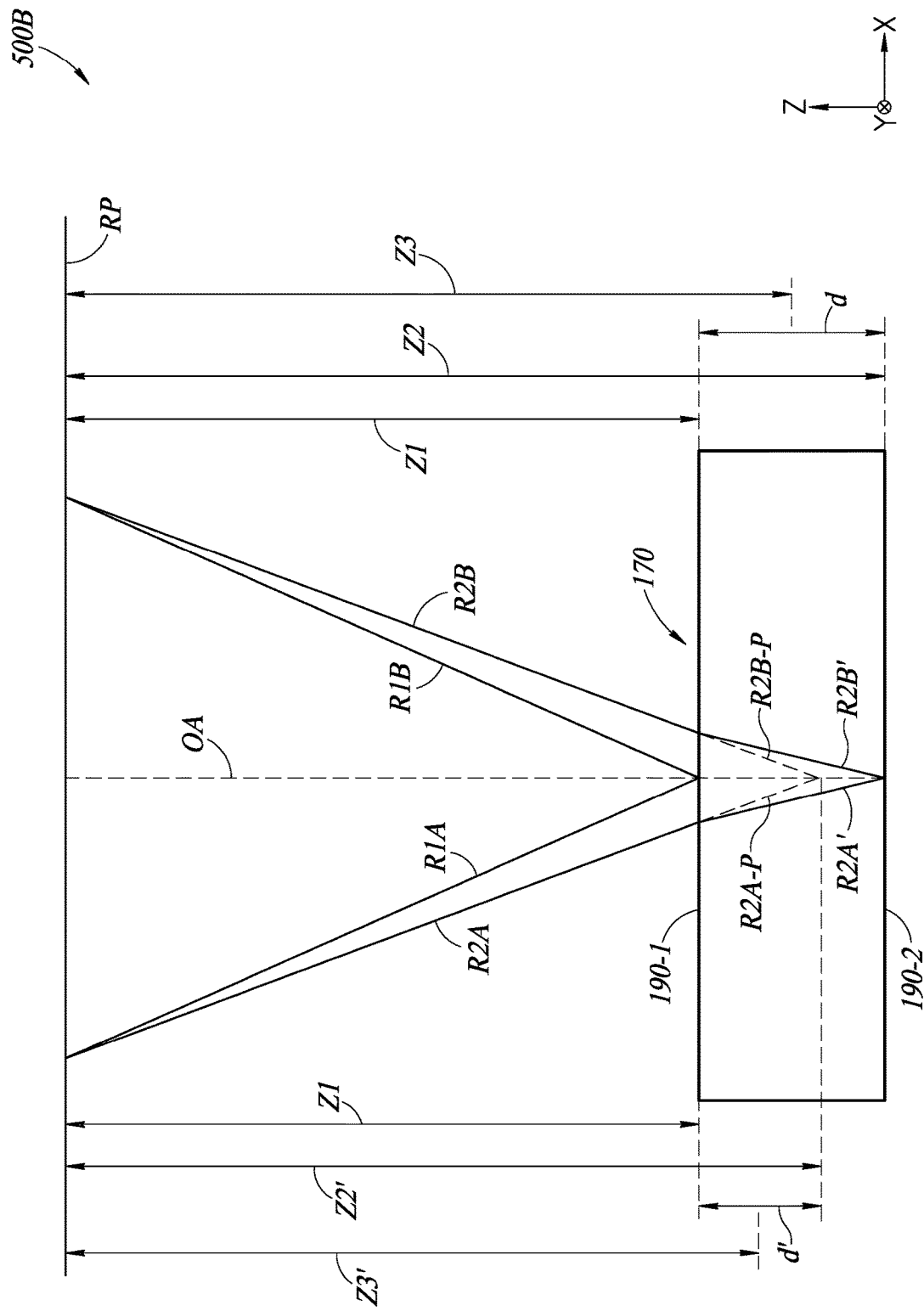
FIG. 5B is a diagram illustrating measurement distances to top and bottom surfaces of a transparent workpiece, including actual and apparent measurement distances to the bottom surface.

FIG. 5B is a diagram 500B illustrating measurement distances to the top surface 190-1 and the bottom surface 190-2 of the transparent workpiece 170, including an actual measurement distance Z2 and an apparent measurement distance Z2' to the bottom surface 190-2. As illustrated in FIG. 5B, rays R1A and R1B (e.g., from the optics portion 150) are shown to focus at the workpiece surface 190-1 (i.e., corresponding to a wavelength that is best in focus at the workpiece surface 190-1), and which in FIG. 5A result in the wavelength peak 502-1 with the corresponding DIC 504-1 which indicates the measurement distance Z1. As also illustrated in FIG. 5B, rays R2A and R2B (e.g., from the optics portion 150) are shown to focus at the workpiece surface 190-2 (i.e., corresponding to a wavelength that is best in focus at the workpiece surface 190-2), and which in FIG. 5A result in the wavelength peak 502-2 with the corresponding DIC 504-2 which indicates an apparent measurement distance Z2'. The apparent measurement distance Z2' is different than the actual measurement distance Z2, due to the index of refraction of the workpiece material at the corresponding wavelength (i.e., corresponding to the wavelength peak 502-2).

More specifically, as illustrated in FIG. 5B, once the rays R2A and R2B enter the workpiece 170, the rays pass through the workpiece material with an angular change due to the index of refraction, as indicated by ray portions R2A' and R2B', which result in the focus at the workpiece surface 190-2, which corresponds to the actual measurement distance Z2. However, projected ray portions R2A-P and R2B-P (i.e., without angular change) within the workpiece indicate a focus corresponding to the apparent measurement distance Z2', which corresponds to the wavelength peak 502-2 with the corresponding DIC 504-2. Some equations which illustrate relationships between the various distances will be described in more detail below.

A relationship between the actual measurement distances Z1 and Z2 and the actual workpiece thickness d can be characterized by the following EQUATION 3:

$$d = Z2 - Z1 \quad \text{(Eq. 3)}$$

Similarly, a relationship between the actual measurement distance Z1 and the apparent measurement distance Z2' and the apparent workpiece thickness d' can be characterized by the following EQUATION 4:

$$d' = Z2' - Z1 \quad \text{(Eq. 4)}$$

A relationship between the actual workpiece thickness d and the apparent workpiece thickness d' can be characterized by the following EQUATION 5:

$$d = (d')(n) \quad \text{(Eq. 5)}$$

where n is the index of refraction of the workpiece material at the corresponding wavelength (e.g., corresponding to the wavelength peak 502-2). The above equations enable a workpiece thickness d to be determined based on measurement profile signals MS(p) such as those of FIG. 5A. More specifically, the determined DICs 504-1 and 504-2 of FIG. 5A indicate the respective measurement distances Z1 and Z2' via a distance calibration lookup table or the like, which is stored in the calibration portion 173 of the memory portion 168, as described above with respect to FIGS. 4A and 4B. The measurement distances Z1 and Z2' can be used to determine the measurement of the apparent workpiece thickness d' in accordance with calculations such as those of EQUATION 4. The measurement of the apparent workpiece thickness d' can then be used to determine the measurement of the actual workpiece thickness d in accordance with calculations such as those of EQUATION 5. As will be described in more detail below, a distance Z3 may be between the distances Z1 and Z2 (e.g., may be an average of the distances Z1 and Z2 and may extend to a midpoint of the actual thickness d), and a related distance Z3' may be between the distances Z1 and Z2' (e.g., may be an average of the distances Z1 and Z2' and may extend to a midpoint of the apparent thickness d').

As another example, FIG. 5A also illustrates a dotted-line representation of a wavelength-dispersed intensity profile from a CRS system with wavelength peaks 502-1a and 502-2a with corresponding peak pixel coordinates ppc1a and ppc2a. The wavelength peaks 502-1a and 502-2a are similar to the wavelength peaks 502-1 and 502-2, except are closer together such that the peaks and corresponding first and second subsets of measurement profile signals 510a have partially merged. In various implementations, this example may correspond to a version of a workpiece 170 that is relatively thin (i.e., for which there is little spacing between the top and bottom surfaces which are relatively close together). As illustrated, in accordance with previously known techniques (e.g., utilizing centroid calculations for determining DICs) this may present certain issues for the determination of the measurement distances to the respective surfaces, and for determining a workpiece thickness as corresponding to a difference between the determined measurement distances. For example, in one implementation the processing as described above may result in an evaluation of the partially merged wavelength peaks 502-1a and 502-2a which (e.g., in accordance with a centroid calculation such as described above with respect to EQUATIONS 1 and 2) may result in a determination of a single DIC 504a, as corresponding to only a single determined measurement distance to the workpiece. In other implementations, the processing may result in a determination of two DICs, but for which it will be appreciated that the partial merging of the wavelength peaks 502-1a and 502-2a may in some instances result in inaccurate determinations of corresponding DICs and/or for which an error message may in some instances be provided (e.g., as indicating an issue with the determination of a corresponding DIC). In any of the above-described circumstances, a corresponding determination of the thickness of the workpiece may be problematic (e.g., may have certain inaccuracies or may not otherwise be able to be determined, etc.).

According to various embodiments of the invention, a CRS system is equipped with a novel approach to determine a workpiece thickness, which results in high accuracy even for relatively thin workpieces (e.g., in various implementations, having a thickness as little as 7 microns, or 5 microns, or 3 microns). Specifically, in one example implementation the CRS electronics portion 160 (FIG. 1) includes a thickness measurement portion 169 which may be utilized by the CRS system to perform a thickness measurement of a workpiece in accordance with principles disclosed herein, and a distance measurement portion 172 which may be utilized by the CRS system 100 is to perform one or more distance measurements to one or more surfaces of a workpiece (e.g., in accordance with previously known techniques). In various implementations, selection of a thickness measurement mode or operation (e.g., utilizing the thickness measurement portion 169) or a distance measurement operation or mode (e.g., utilizing the distance measurement portion 172) may be made in response to a user input received via the user interface 171, or automatically. For example, in response to positioning the optical pen relative to a workpiece (e.g., a transparent workpiece), a thickness operation or mode may be automatically or manually selected for determining the thickness of the workpiece.

As will be described in more detail below, in various implementations of a thickness measurement operation or mode, the signal processor 166 may execute an algorithm (e.g., comprising transform or other processing) as stored in the thickness measurement portion 169 of the memory portion 168. The algorithm (e.g., utilizing transform processing) is performed on the spectral profile data outputted from the wavelength detector 162 to determine a thickness of a workpiece. In operation, the optical pen 120 is connected to the CRS electronics portion 160 and operably positioned relative to the workpiece 170 to perform the thickness measurement operations. The thickness measurement operations include the optical pen 120 inputting an input spectral profile from the illumination source 164 and outputting corresponding radiation to the two surfaces 190-1 and 190-2 (i.e., "surface 1" and "surface 2") of the workpiece 170. The optical pen 120 receives reflected radiation from the two surfaces and outputs the reflected radiation to the CRS wavelength detector 162, which then provides output spectral profile data, for which the workpiece thickness is determined based on processing of the output spectral profile data (e.g., utilizing transform processing such as Fourier transform processing or Fourier-related transform processing, etc.).

Figure 6:
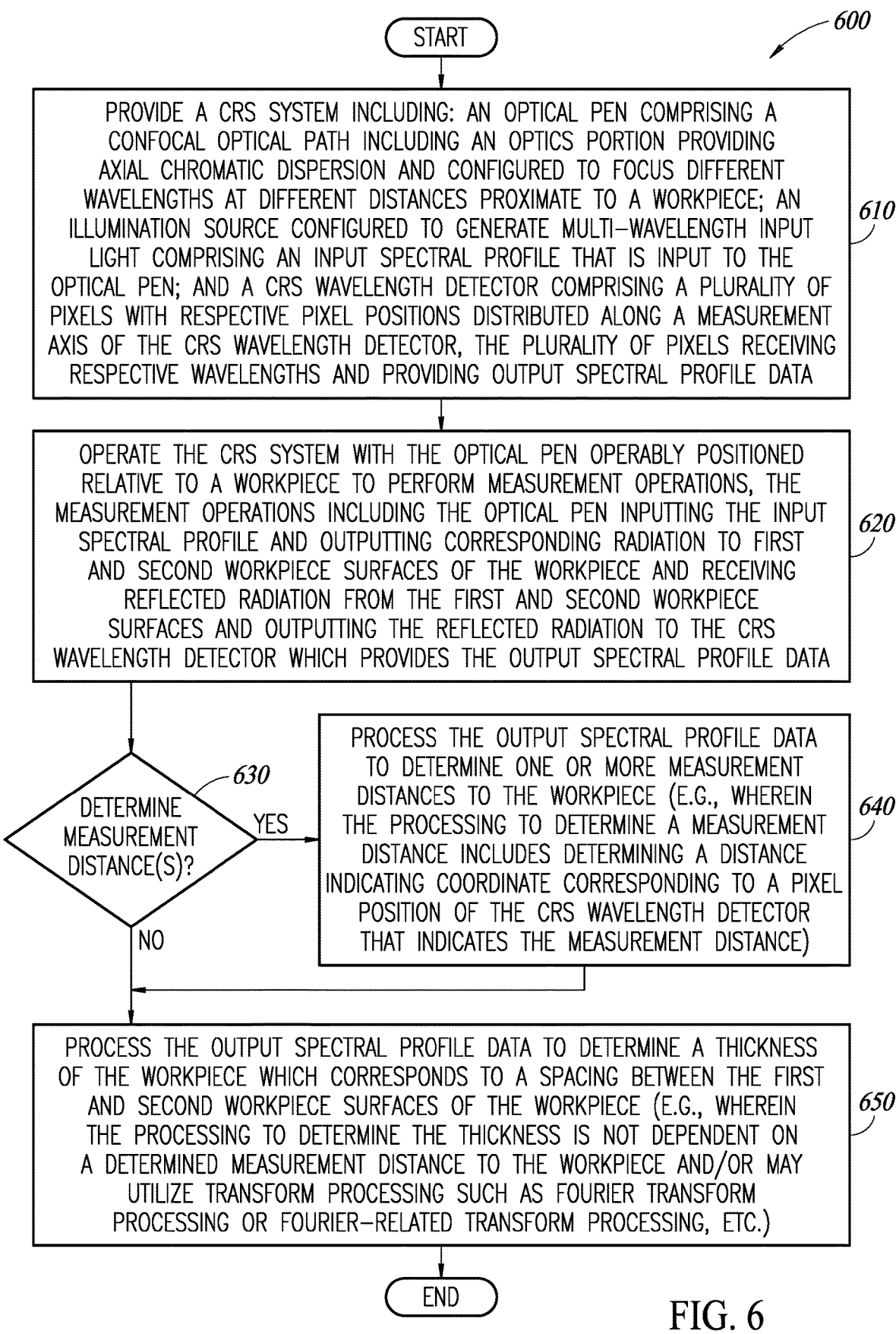
FIG. 6 is a flow diagram illustrating a method of operating a CRS system to determine a workpiece thickness.

FIG. 6 is a flow diagram illustrating an exemplary method 600 of operating the CRS system 100 to determine a workpiece thickness. At a block 610, a CRS system is provided comprising: an optical pen 120 comprising a confocal optical path including an optics portion 150 providing axial chromatic dispersion and configured to focus different wavelengths at different distances proximate to a workpiece 170; an illumination source 164; and a CRS wavelength detector 162 comprising a plurality of pixels with respective pixel positions distributed along a measurement axis of the CRS wavelength detector, wherein the plurality of pixels receive respective wavelengths and provide output spectral profile data. At a block 620, the CRS system 100 is operated with the optical pen operably positioned relative to a workpiece to perform measurement operations, the measurement operations including the optical pen inputting the input spectral profile and outputting corresponding radiation to first and second workpiece surfaces of the workpiece and receiving reflected radiation from the first and second workpiece surfaces and outputting the reflected radiation to the CRS wavelength detector which provides the output spectral profile data.

At a decision block 630, a determination is made as to whether one or more measurement distances are to be determined. If one or more measurement distances are not to be determined, the method proceeds to a block 650, as will be described in more detail below. If one or more measurement distances are to be determined, the method proceeds to a block 640, where the output spectral profile data is processed to determine the one or more measurement distances to the workpiece (e.g., wherein the processing to determine a measurement distance may include determining a distance indicating coordinate corresponding to a pixel position of the CRS wavelength detector that indicates the measurement distance).

From block 640, or if one or more measurement distances are not to be determined at block 630, the method proceeds to block 650, where the output spectral profile data is processed to determine a thickness of the workpiece which corresponds to a spacing between the first and second workpiece surfaces of the workpiece (e.g., wherein the processing to determine the thickness is not dependent on a determined measurement distance to the workpiece and/or may utilize transform processing such as Fourier transform processing or other Fourier-related transform processing, etc.). In various implementations, Fourier-related transform processing may include linear transformations of functions related to Fourier analysis (e.g., which may map a function to a set of coefficients of basis functions, where the basis functions may be sinusoidal and may be strongly localized in the frequency spectrum). Some examples include cosine transforms, sine transforms, Laplace transforms, etc.

As described above (e.g., with respect to the dotted-line measurement profile signals 510a of FIG. 5A, etc.), in various implementations, it may be difficult to determine accurate distance indicating coordinates for opposing surfaces of a workpiece (e.g., of a thin workpiece due to the wavelength peaks at least partially merging, etc.). In some instances, the wavelength peaks may be merged to an extent for which only a single distance indicating coordinate (e.g., DIC 504a of FIG. 5A) may be determined. In other instances, two distance indicating coordinates may be determined, but for which there may be inaccuracies and/or processing issues due to the merging of the wavelength peaks (e.g., for which a centroid calculation for a first wavelength peak to determine a corresponding first distance indicating coordinate may be partially skewed or otherwise affected by a merged second wavelength peak, and vice versa). Due to such potential issues, it is desirable in some instances to be able to determine a thickness of a workpiece, without requiring distance determinations using centroid calculations such as those of the previously known techniques as described above. As will be described in more detail below, alternative techniques for determining a workpiece thickness (e.g., utilizing transform processing) are disclosed herein.

In various implementations, a distance and/or distances determined by previously known techniques may still provide useful information (e.g., which may in some instances be utilized in combination with a thickness that is determined in accordance with principles disclosed herein). For example, as will be described in more detail below (e.g., with respect to EQUATIONS 6-10), in some instances, a measurement distance to a workpiece that is determined (e.g., at block 640) may be utilized in combination with a thickness of the workpiece that is determined in accordance with principles disclosed herein (e.g., at block 650).

As noted above, in some instances, wavelength peaks corresponding to two opposing workpiece surfaces may be merged to an extent for which only a single distance indicating coordinate (e.g., DIC 504a of FIG. 5A) may be determined. In some implementations, such a distance indicating coordinate (e.g., DIC 504a of FIG. 5A) may represent a measurement distance such as distance Z3' of FIG. 5B. The distance Z3' is between the distances Z1 and Z2' (e.g., and may correspond to an average of the distances Z1 and Z2' and may extend to a midpoint of the apparent thickness d'). The distance Z3' is related to the distance Z3, which is similarly to a point inside the workpiece 170 that is between the first and second workpiece surfaces 190-1 and 190-2. In some implementations, the point inside the workpiece corresponding to the distance Z3 may be at a midpoint between the first and second workpiece surfaces 190-1 and 190-2, for which the distance Z3 corresponds to an average of first and second distances Z1 and Z2 to the respective first and second workpiece surfaces 190-1 and 190-2 (e.g., for which the distance Z3 extends to a midpoint of the actual thickness d).

For example, with respect to the dotted-line measurement profile signals 510a of FIG. 5A as corresponding to a thin version of the workpiece 170, if the wavelength peaks 502-1a and 502-2a corresponding to the workpiece surfaces 190-1 and 190-2 (e.g., with peak pixel coordinates ppc1a and ppc2a), have similar characteristics (e.g., are of similar size, etc.), then a centroid or similar calculation may result in a distance indicating coordinate (e.g., DIC 504a) that is approximately/nominally at a midpoint between the two wavelength peaks. In such a case, the corresponding measurement distance (e.g., distance Z3') is approximately an average of the first and second distances Z1 and Z2'. In some implementations, such a determined measurement distance (e.g., distance Z3'), may be utilized in combination with the determined thickness d of the workpiece (e.g., as determined at block 650) to determine the first and/or second measurement distances Z1 and Z2 to the first and second workpiece surfaces 190-1 and 190-2. For example, if the distance Z3' is assumed to be at a midpoint between the distances Z1 and Z2', and if the apparent thickness d' corresponds to a difference between the distances Z1 and Z2' (for which d'=Z2'−Z1), and if the thickness d of the workpiece 170 is assumed to correspond to a spacing between the workpiece surfaces 190-1 and 190-2 (for which d=Z2−Z1), then the following equations indicate some of the relationships between the various distances:

$$Z1 = Z3 - (d/2) \qquad \text{(Eq. 6)}$$

$$Z2 = Z3 + (d/2) \qquad \text{(Eq. 7)}$$

$$Z1 = Z3' - (d'/2) \qquad \text{(Eq. 8)}$$

$$Z2' = Z3' + (d'/2) \qquad \text{(Eq. 9)}$$

In accordance with the above equations, in various implementations, a determined workpiece thickness d may be utilized in combination with a determined distance (e.g., distance Z3' as an average of distances Z1 and Z2') in order to determine a distance to a workpiece surface (e.g., distance Z1 to workpiece surface 190-1). For example, the following EQUATION 10 results from a combination of EQUATIONS 5 and 8:

$$Z1=Z3'-(d/2n) \tag{Eq. 10}$$

and for which Z2 can then also be determined (e.g., in accordance with EQUATION 3).

As noted above, in some instances, in accordance with previously known techniques, the processing may produce two DICs that correspond to two wavelength peaks that are partially merged. In some cases, the two determined DICs may have inaccuracies (e.g., due to the merged peaks). In some such implementations, (e.g., for which the two DICs may be assumed to have been skewed by similar amounts toward a midpoint due to the merged peaks) the two measurement distances corresponding to the two DICs may be averaged in order to determine an approximate mid-point measurement distance (e.g., similar to distance Z3'), which may then be utilized in combination with a determined thickness d of the workpiece (e.g., as determined at block 650) to provide more accurate determinations of the distances Z1 and Z2 (e.g., through utilization of processing such as EQUATION 10, etc.).

In some implementations, for a given set of output spectral profile data, a selection may be made and/or processing may be performed to determine if a thickness of a workpiece should be determined in accordance with principles disclosed herein, or alternatively in accordance with previously known methods (e.g., utilizing centroid calculations to determine distance indicating coordinates and a corresponding difference between measurement distances, such as described above with respect to the DICs 504-1 and 504-2 of FIG. 5A and EQUATIONS 4 and 5). For example, for a certain workpiece (e.g., a relatively thinner workpiece with little separation between the wavelength peaks and corresponding peak merging or other issues), a user may select and/or processing may be performed (e.g., automatically) to determine that techniques as disclosed herein should be utilized for determining the thickness. Alternatively, for a certain workpiece (e.g., a relatively thicker workpiece with a relatively significant separation between the wavelength peaks and without any significant peak merging issues, etc.), a user may select and/or processing may be performed (e.g., automatically) to determine that previously known methods should be utilized for determining the thickness. In some implementations, such determinations may be made based at least in part on processing the output spectral profile data utilizing both the previously known methods and the techniques disclosed herein, and comparing/analyzing the different results to determine which thickness determination technique may be preferred/utilized (e.g., most accurate, practical, etc.) for a given implementation (e.g., which may also depend on additional factors, such as the measurement range of the particular optical pen/CRS system that is being utilized, etc.).

FIGS. 7A-7D illustrate a thickness measurement process using transform processing as part of a deconvolution method. Deconvolution is used to improve the determination of the locations of two wavelength peaks which may not be well defined and/or well separated from each other. Specifically, in one aspect, deconvolution is used to reduce the peak widths such that a distance between the two peaks can be better and more accurately determined (e.g., in accordance with a corresponding calculation, etc.).

Figure 7A:
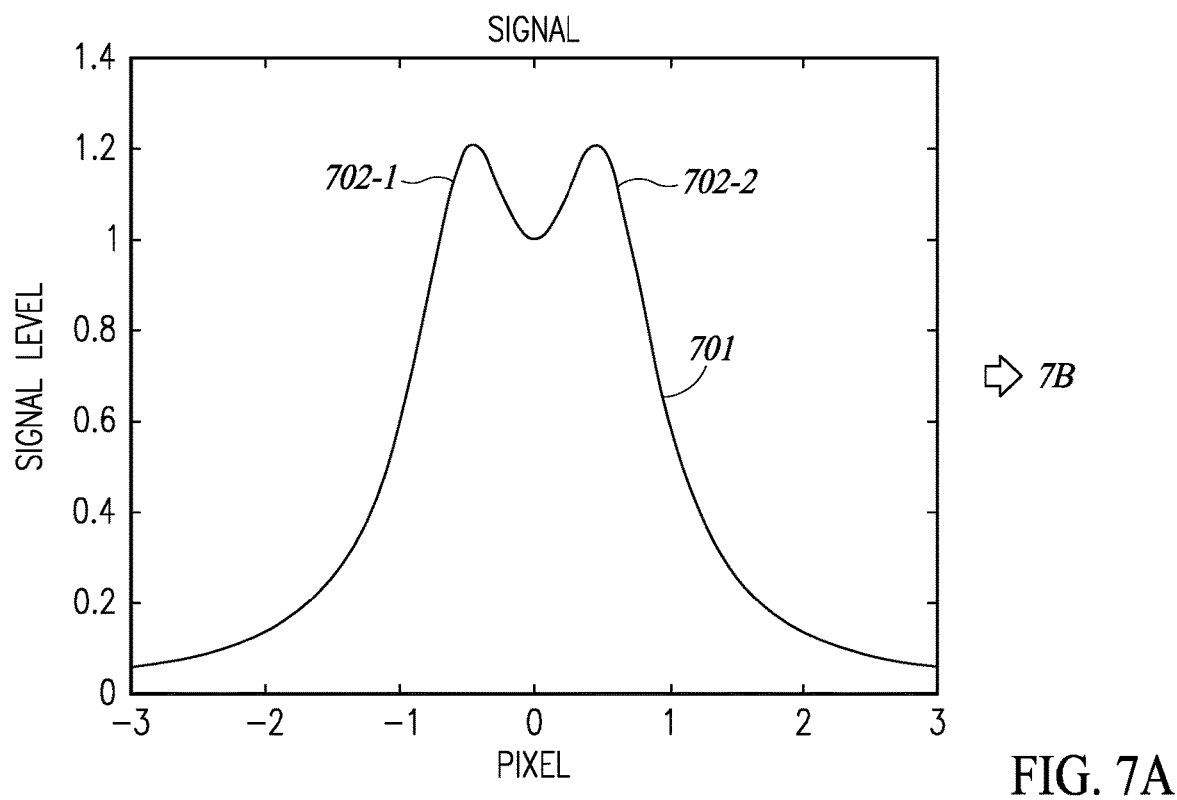
FIGS. 7A-7D illustrate a process for workpiece thickness measurement using transform processing.

FIG. 7A illustrates an intensity profile (or "output spectral profile data") 701 outputted from the wavelength detector 162 comprising signal level or intensity (vertical axis) as a function of pixel coordinates or "pixel positions" (horizontal axis), similar to FIGS. 3, 5A and 10A-10F as described above. The intensity profile 701 includes first and second wavelength peaks 702-1 and 702-2, as corresponding to first and second workpiece surfaces (e.g., workpiece surfaces 190-1 and 190-2 of FIG. 1).

Figure 7B:
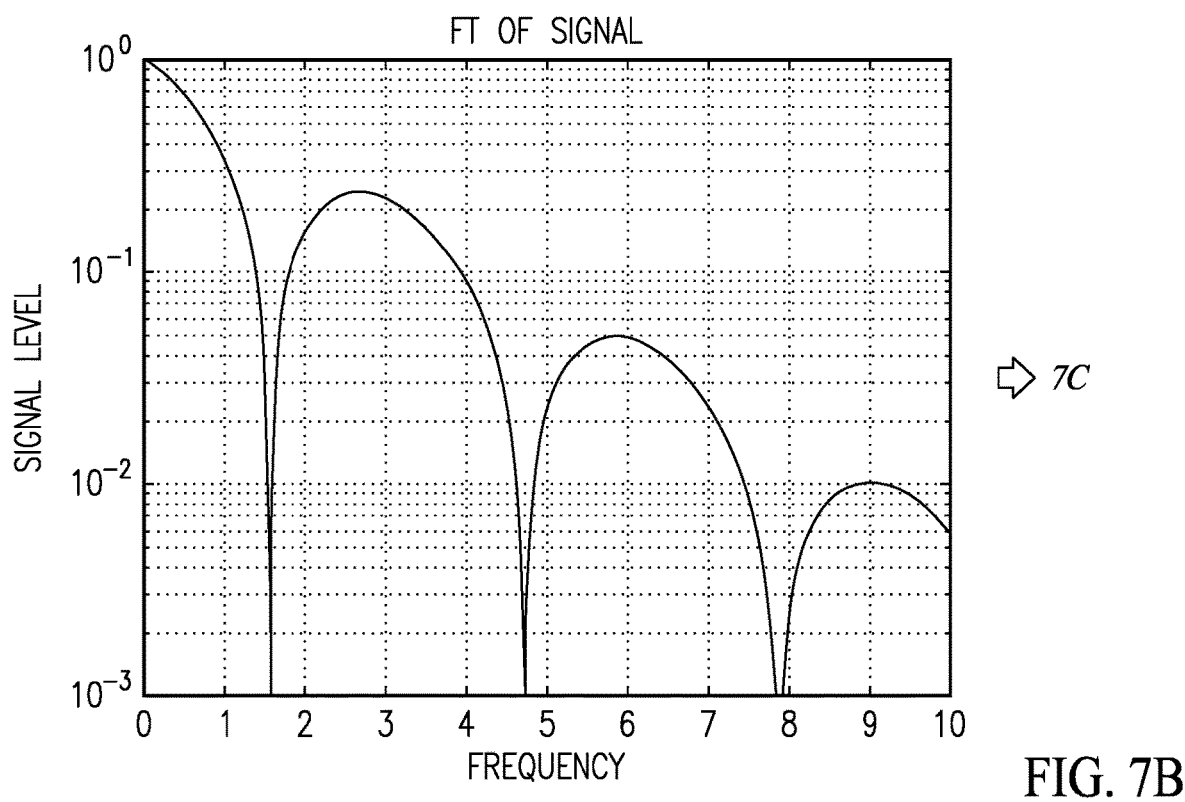
Figure 7C:
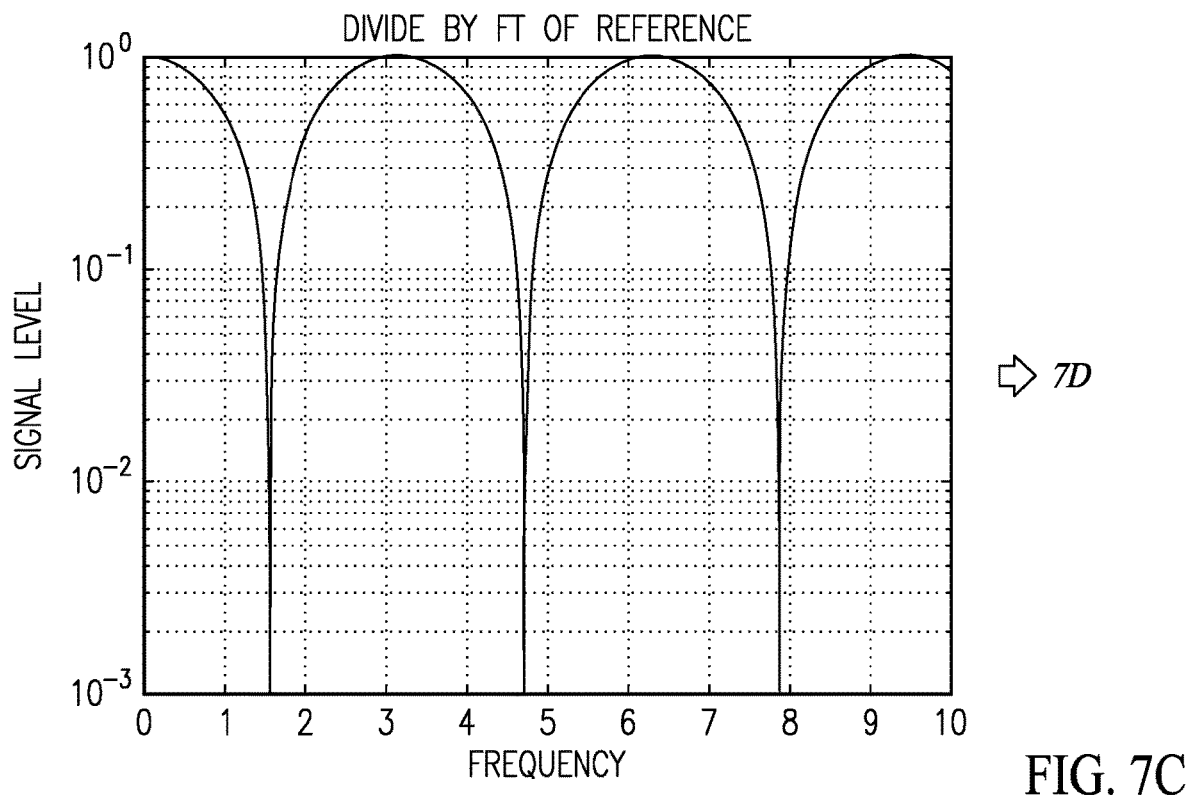
Figure 7D:
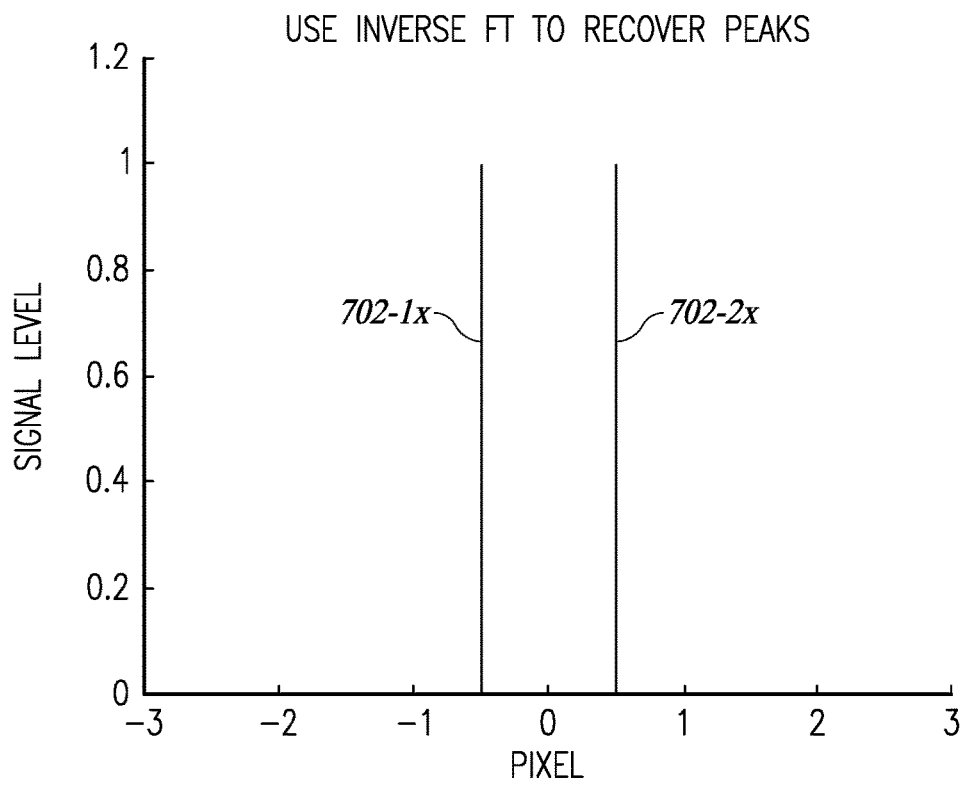

In various implementations, transform processing that is performed to determine the thickness of the workpiece (e.g., workpiece 170) may include computing a transform (e.g., a Fourier transform) of the output spectral profile data 701, as in FIG. 7B. Then, the Fourier transform of the output spectral profile data may be divided by a Fourier transform of a reference (e.g., as illustrated in FIG. 7C) to thereby obtain a Fourier transform of target spectral profile data. In various implementations, the reference may be a mathematical reference function (e.g., a Lorentzian reference, etc.). In other implementations, the reference may be obtained, for example, as output spectral profile data obtained for a "reference" workpiece (e.g., for which the top surface is located at the same distance from the optical pen as the workpiece surface 190-1), which may be a thick glass workpiece such that the reflection from only the top surface is represented in the output spectral profile data (e.g., for which the bottom surface of the thick glass workpiece may be out of the range of the optical pen or otherwise such that reflections from the bottom surface are not included in the output spectral profile data). Finally, an inverse Fourier transform of the Fourier transform of the target spectral profile data is computed, to recover first and second wavelength peaks 702-1x and 702-2x as in FIG. 7D, for which the pixel locations are more easily/accurately determined and which thereby enable an enhanced and improved determination of the corresponding pixel locations of the original two peaks 702-1 and 702-2 included in the output spectral profile data 701 of FIG. 7A. In various implementations, the locations of the peaks as indicated by the pixel locations may then be referenced to a distance calibration lookup table or the like (e.g., as described above with respect to FIGS. 4A and 4B) to determine the distances Z1 and Z2', for which the thickness d of the workpiece may be determined according to calculations such as those of EQUATIONS 4 and 5.

As will be described in more detail below with respect to FIGS. 8-9H, additional techniques are further disclosed herein, which in some implementations may have certain advantages over the techniques such as those illustrated in relation to FIGS. 7A-7D. For example, the deconvolution type technique described in reference to FIGS. 7A-7D may improve and enhance the determination of the pixel locations of the two peaks in output spectral profile data, but for which in some implementations the dividing by the reference (e.g., FIG. 7C) may cause the signal portions associated with the high frequency noise in the Fourier transform of the profile data to increase. While such high frequency noise may be mitigated by the use of a low pass filter, fine-tuning such a low pass filter may present certain challenges (e.g., fine tuning the filter requires achieving a balance between narrow peaks and signal stability, etc.). In various implementations, at least some of these potential issues may be addressed by alternatively utilizing techniques such as those described in more detail below with respect to FIGS. 8-9H.

Figure 8:
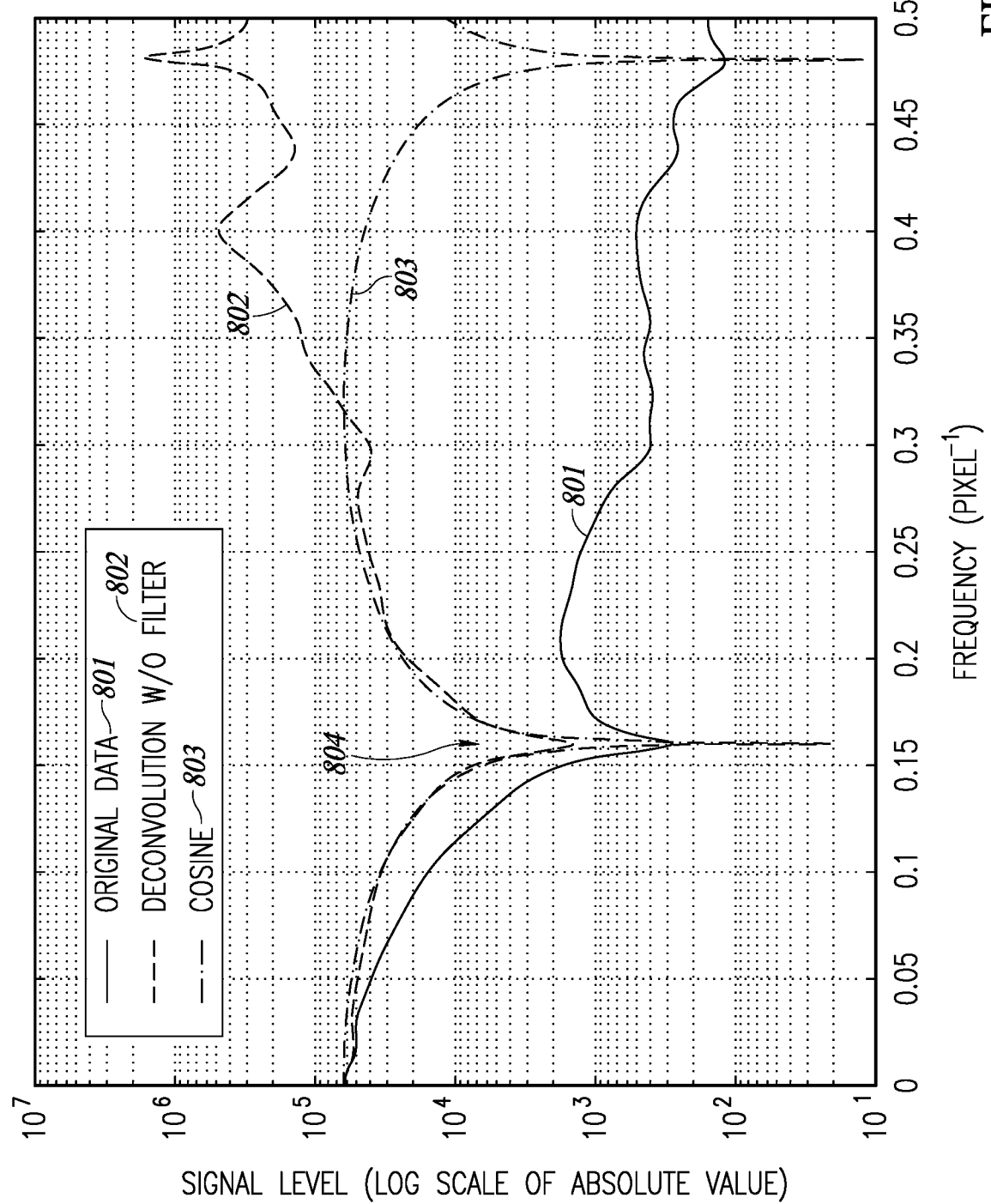
FIG. 8 illustrates a workpiece thickness measurement process using Fast Fourier Transform (FFT) processing as part of a deconvolution method.

FIG. 8 illustrates certain aspects of a thickness measurement process using transform processing (e.g., including Fast Fourier Transform (FFT) processing). Certain curves illustrated in FIG. 8 are similar and/or related to certain curves illustrated in FIGS. 7A-7D, as will be described in more detail below. FIG. 8 illustrates an original data Fourier transform curve 801 which is the Fourier transform of the intensity profile (or "output spectral profile data"), comprising signal level (log scale of absolute value) (vertical axis) as a function of frequency (pixel$^{-1}$) (horizontal axis), and for which the determining of the Fourier transform as curve 801 is similar to the determining of the Fourier transform curve of FIG. 7B. A deconvolution output curve 802 illustrates a result of a process similar to that described above with respect to FIG. 7C, for which the Fourier transform curve 801 is divided by a Fourier transform of a reference, and for which, in this example, a low pass filter is not utilized to mitigate high frequency noise and as a result the noise component in the curve 802 is illustrated as increasing (e.g., exponentially or otherwise) for the higher frequency components. A technique that avoids such issues is described in more detail below with respect to the curve 803.

In relation to the curve 803, it will be appreciated that for a profile including two wavelength peaks corresponding to two reflections (i.e., from two workpiece surfaces) of equal intensity, where the measurement distance Z1 corresponding to the top surface and the apparent measurement distance Z2' corresponding to the bottom surface are indicated as being at equal distances, +d'/2 and −d'/2 (e.g., see EQUATIONS 8 and 9), from a corresponding midpoint (e.g., corresponding to an apparent midpoint measurement distance Z3'), an ideal Fourier transform of the intensity profile data including the two reflections of equal intensity is a Fourier transform cosine curve 803, as illustrated in FIG. 8 and according to the following EQUATION 11:

$$F(\delta(x-d'/2)+\delta(x+d'/2))=2\cos(k(d'/2)) \quad \text{(Eq. 11)}$$

where d' is the apparent thickness of the workpiece and k is the spatial frequency.

In various implementations, the process of FIGS. 7A-7D may be characterized as attempting to recover a cosine curve similar to the cosine curve 803 of FIG. 8, but for which as noted above a low pass filter is required to mitigate increasing high frequency noise as illustrated in curve 802 and for which there may be certain challenges for fine tuning the low pass filter. In accordance with principles disclosed herein, since it is anticipated that an ideal end result would be a cosine curve, an alternative approach is to determine the first dip in the absolute value of the Fourier transform (e.g., the absolute value of the FFT which outputs complex numbers) which indicates the cosine period and correspondingly the workpiece thickness, such as indicated by the following EQUATION 12:

$$d=n(\partial z/\partial \lambda)/(2f_{dip}) \quad \text{(Eq. 12)}$$

where d is the thickness of the workpiece, n is the index of refraction of the workpiece material at the corresponding wavelength (i.e., for which in accordance with EQUATION 5, d=(d')(n)), and units of $f_{dip}$ are 1/λ. The term ∂z/∂k is related to a rate of change of z in relation to pixel position/wavelength, for which as partially illustrated in FIG. 4A by the curve of the CRS measurement distance calibration data 410A, the change in z for a unit of pixel change is higher for lower wavelengths/pixel positions (e.g., closer to a blue wavelength part of the range) and is lower for higher wavelengths/pixel positions (e.g., closer to a red wavelength part of the range). This is similarly illustrated by the example values in the distance calibration lookup table 410B of FIG. 4B, for which the change in z (i.e., measurement distance) for a 0.1 change in the DIC is higher for the lower DICs (e.g., the change in z is 37.0303 μm-36.9029 μm=0.1274 μm between the DICs of 104.1 and 104.2) and is lower for higher DICs (e.g., the change in z is 486.6733 μm-486.6540 μm=0.0193 μm between the DICs of 990.1 and 990.2) As noted above, the portion of the range that is being utilized is in accordance with the distance of the workpiece from the optical pen (e.g., in accordance with the wavelength that is best in focus at the aperture 195 as described above with respect to FIGS. 1-3). As some specific example values, in one implementation in a blue wavelength portion of the range ∂z/∂k=8 μm/pixel, and in a red wavelength portion of the range ∂z/∂k=2 μm/pixel.

As some specific example values in relation to EQUATION 12 and the illustration of FIG. 8, if the workpiece material is fused silica with an index of refraction such that n=1.46, and the workpiece is positioned relative to the optical pen in a portion of the range for which ∂z/∂k=5.49 μm/pixel, and the value/location of $f_{dip}$ along the x axis in FIG. 8 corresponds to 0.16, then in accordance with EQUATION 12, the thickness d can be determined in accordance with d=(1.46(5.49 μm/pixel))/(2(0.16/pixel))=25 μm. Thus, according to various exemplary aspects of the present invention, transform processing (e.g., utilizing a Fast Fourier Transform (FFT)) may be utilized to determine a first dip 804 in a Fourier transform curve 801 (e.g., which is indicative of the cosine period), and based on which the thickness "d" of the workpiece can be determined (e.g., in accordance with calculations such as the example EQUATION 12).

In various implementations, a value of $f_{dip}$ may be determined in accordance with a dip finding algorithm (e.g., which in some implementations may be similar to or include a peak finding algorithm that has been repurposed as a dip finding algorithm). In various implementations, such algorithms may include operations such as taking a derivative and searching for zero crossings (e.g., such as a first zero crossing as corresponding to a first dip, etc.). In various implementations, false peaks/dips that may otherwise occur due to noise or similar factors may be suppressed or otherwise addressed by smoothing and/or thresholding operations, etc.

As noted above, in various implementations, certain of the techniques disclosed herein (e.g., such as illustrated by EQUATION 12) may enable accurate thickness measurements/determinations for thinner workpieces than can be measured utilizing previously known techniques. As some examples, some calculations of minimum thicknesses measurable with previously known techniques will be described in more detail below and will be compared to minimum thicknesses measurable with techniques disclosed herein.

The following numerical examples are in relation to the previously known centroid type techniques for determining DICs in accordance with calculated centroid values (e.g., as described above with respect to the distance indicating coordinates 504-1 and 504-2 of FIG. 5A). In one specific example implementation, an optical pen of a CRS system may be provided for which in a blue wavelength portion of the range ∂z/∂k=8 μm/pixel, and in a in a red wavelength portion of the range ∂z/∂k=2 μm/pixel. In one implementation, it may be determined that when utilizing the previously known centroid type techniques as described above, the wavelength peaks can be measured (i.e., for which the pixel positions can be accurately determined) when the peaks are separated at least by a full-width half-maximum (FWHM) value, which in the blue wavelength portion of the range may correspond to FWHM=3 pixels, and in the red wavelength portion of the range may correspond to FWHM=6 pixels. In such an implementation, where n=1.5 for a glass workpiece, the minimum thickness of a workpiece that may be able to be accurately measured is $d_{min}=n(\partial z/\partial k)(FWHM)$, which for the values indicated above for the blue wavelength portion of the range may correspond to $d_{min}=36$ μm, and which for the values indicated above for the red wavelength portion of the range may correspond to $d_{min}$=18 µm.

In comparison, in accordance with certain of the techniques disclosed herein (e.g., such as illustrated by EQUATION 12 for certain "first dip" type techniques), assuming utilization of the same CRS system with the same optical pen, a minimum thickness of a workpiece that can accurately be measured may correspond approximately to a Nyquist frequency, for which $f_{dip}$ may approximately be equal 0.5, and for which EQUATION 12 may thus reduce to $d_{min}$=n ($\partial z/\partial \lambda$), which for the blue wavelength portion of the range may correspond to $d_{min}$=12 µm (i.e., which is approximately ⅓, or 33.3%, of the $d_{min}$=36 of the previously known centroid techniques as described above), and which for the red wavelength portion of the range may correspond to $d_{min}$=3 µm (i.e., which is approximately ⅙, or 16.7% of the $d_{min}$=18 µm of the previously known centroid techniques as described above).

In addition, in accordance with certain other of the techniques disclosed herein (e.g., as described above with respect to FIGS. 7A-7D for certain "deconvolution" type techniques), assuming utilization of the same CRS system with the same optical pen, in one implementation it has been experimentally determined that a minimum thickness of a workpiece that can accurately be measured may correspond to a peak separation of approximately (0.85)FWHM, for which the blue wavelength portion of the range may correspond to $d_{min}$=30.6 µm (i.e., which is 85% of the $d_{min}$=36 of the previously known centroid techniques as described above), and which for the red wavelength portion of the range may correspond to $d_{min}$=15.3 µm (i.e., which is 85% of the $d_{min}$=18 of the previously known centroid techniques as described above). It will be appreciated that given the complexities of optical pens of CRS systems, such improvements in the measurable thickness ranges are difficult to obtain and may be particularly advantageous for certain implementations (e.g., for which accurate measurements of the thicknesses of certain thin workpieces and/or workpiece portions may be desirable, etc.).

In further regard to certain of the "first dip" type techniques described above with respect to FIG. 8, certain additional examples of a first dip being determined are illustrated in FIGS. 9A-9D. The examples of FIGS. 9A-9D illustrate that, regardless of the position of the workpiece (e.g., having thickness=25 µm) within the operable measuring range relative to the optical pen 120, the processing method of FIG. 8 results in a Fourier transform of the signal with a first dip, and for which the location of the first dip can be used to determine the thickness of the workpiece (e.g., in accordance with calculations such as those of EQUATION 12). In the examples of FIGS. 9A-9D, the workpiece 170 may be placed on the stage 175 of the CRS system 100 (see FIG. 1), for which the top surface 190-1 is at 300 µm, 400 µm, 500 µm, and 800 µm, respectively, from a measurement reference position RP of the optical pen 120 of the CRS system 100 (i.e., for which the wavelength peaks are illustrated as being located at different corresponding relative positions along the pixel/wavelength range of the detector as illustrated by the corresponding x-axis positions).

FIGS. 9A-9D illustrate corresponding intensity profiles 902A, 905A, 908A, 911A outputted from the wavelength detector 162 comprising signal level or intensity (vertical axis) as a function of pixel coordinates or "pixel positions" (horizontal axis), similar to FIGS. 3, 5A, 7A and 10A-10F described above. It is noted that in a blue wavelength part of the Z range of the CRS system 100 closer to the optical pen 120, the two wavelength peaks of the intensity profile appear to have fully merged together as in FIGS. 9A and 9B, while in a red wavelength part of the Z range of the CRS system 100 farther from the optical pen 120, the two wavelength peaks of the intensity profile are at least somewhat recognizable/distinguishable as in FIGS. 9C and 9D. FIGS. 9A-9D also illustrate intensity profiles 903A, 906A, 909A, 912A corresponding to a "reference" workpiece, which may be a thick glass workpiece such that the reflection from only the top surface of the reference workpiece is represented in the intensity profiles, as described above with respect to FIG. 7C.

Figure 9A:
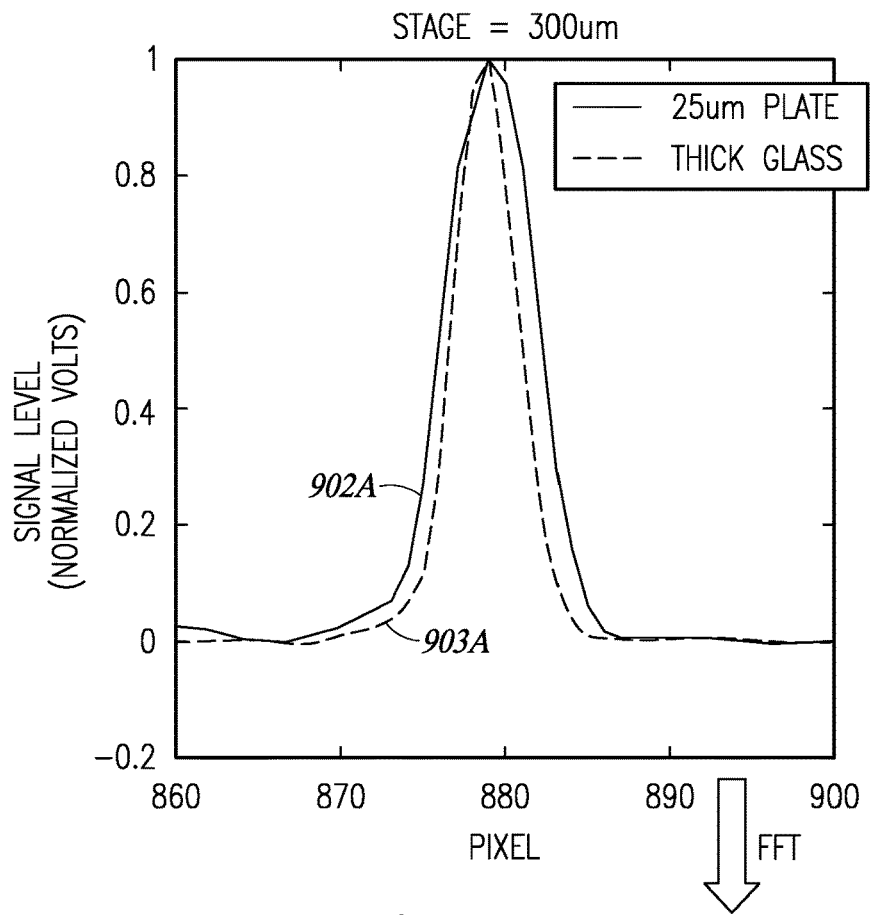
FIGS. 9A-9H illustrate examples for which, regardless of the position of the workpiece within the operable measurement range relative to the optical pen, the FFT processing method of FIG. 8 determines a location of a first dip in the Fourier transform of the signal that can be used to determine the thickness of the workpiece.
Figure 9E:
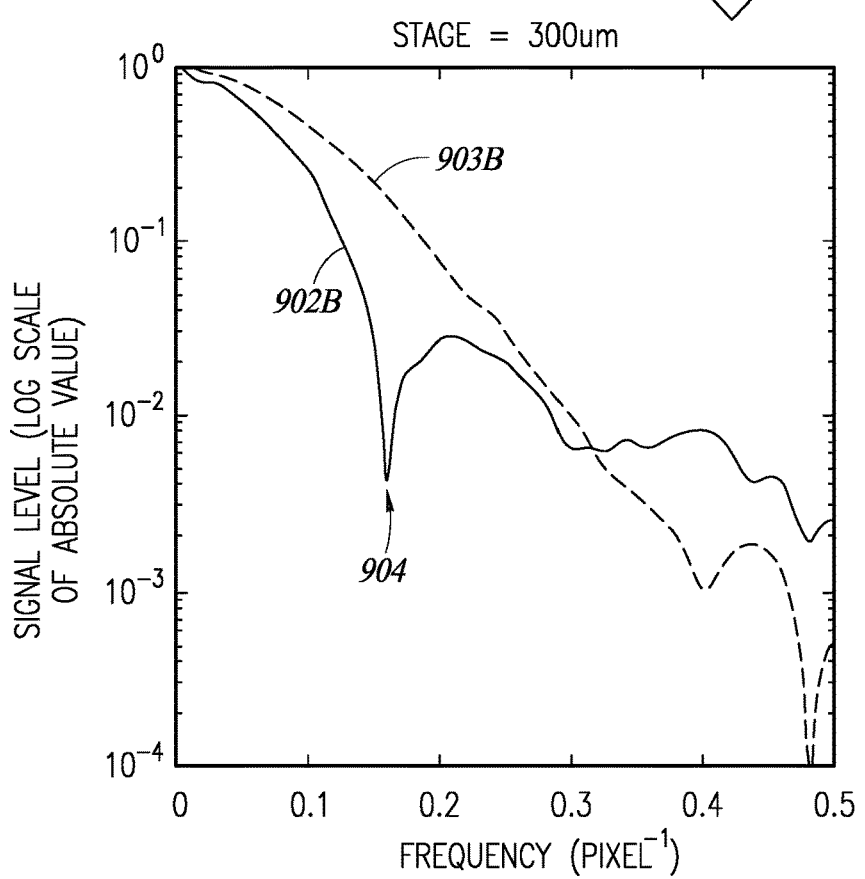
Figure 9B:
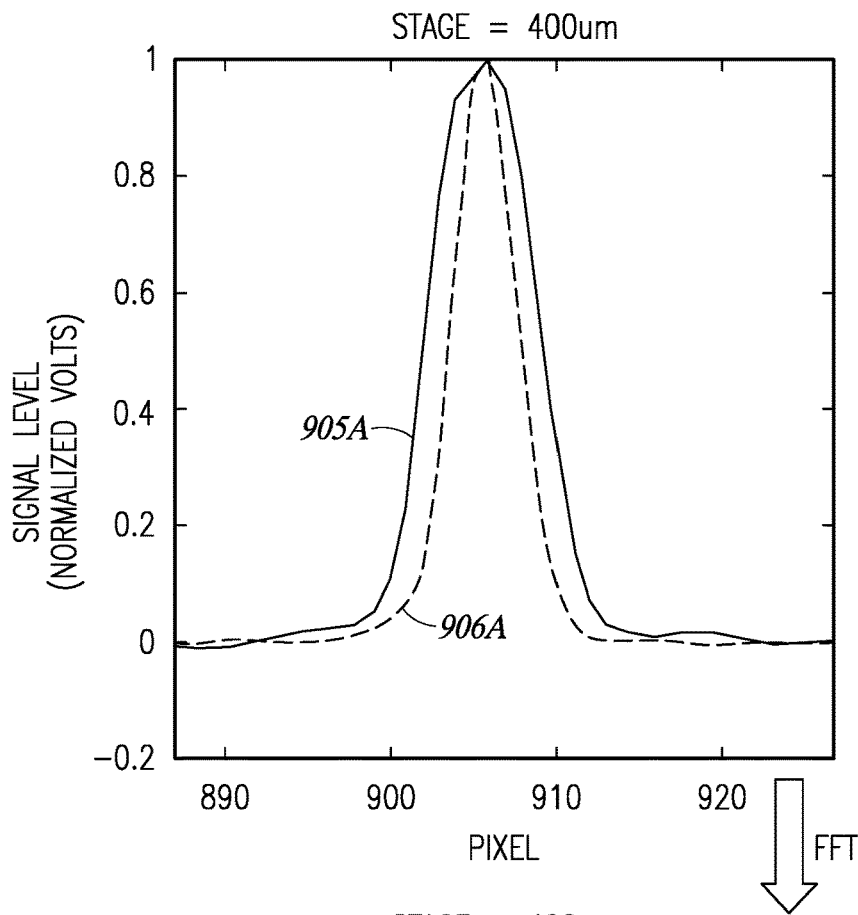
Figure 9F:
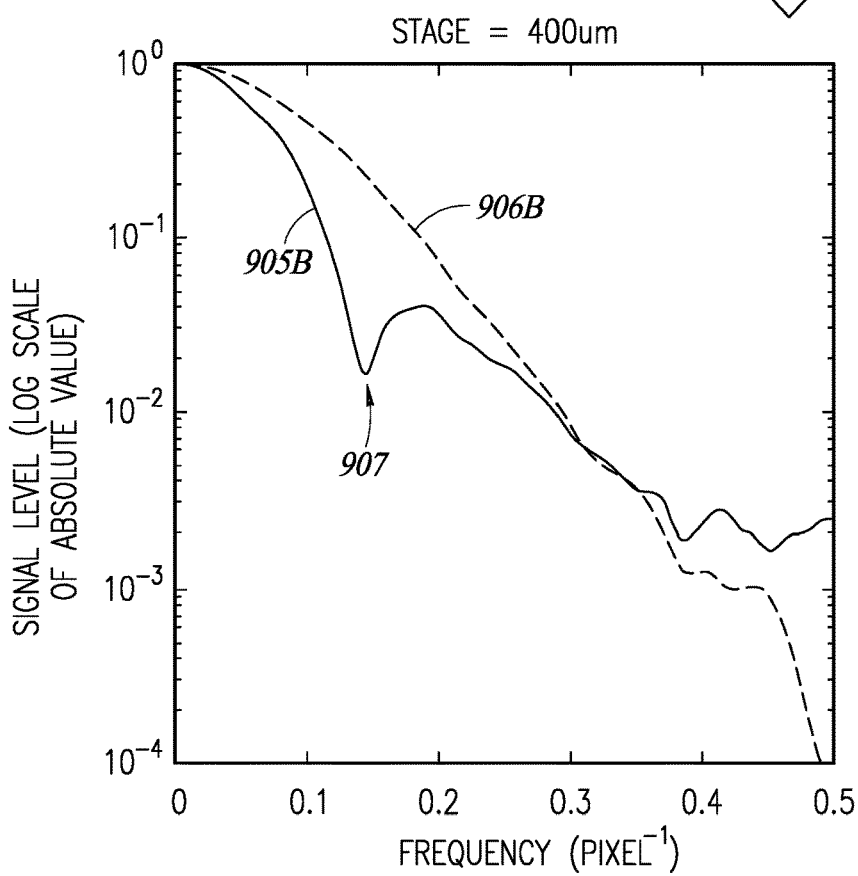
Figure 9C:
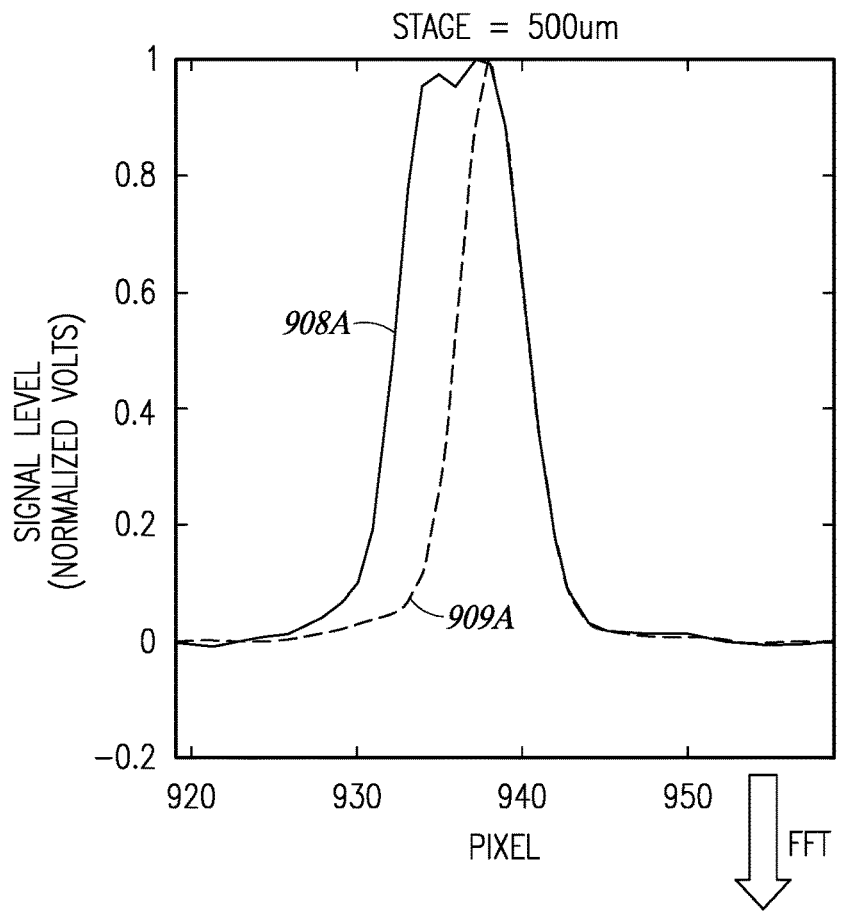
Figure 9G:
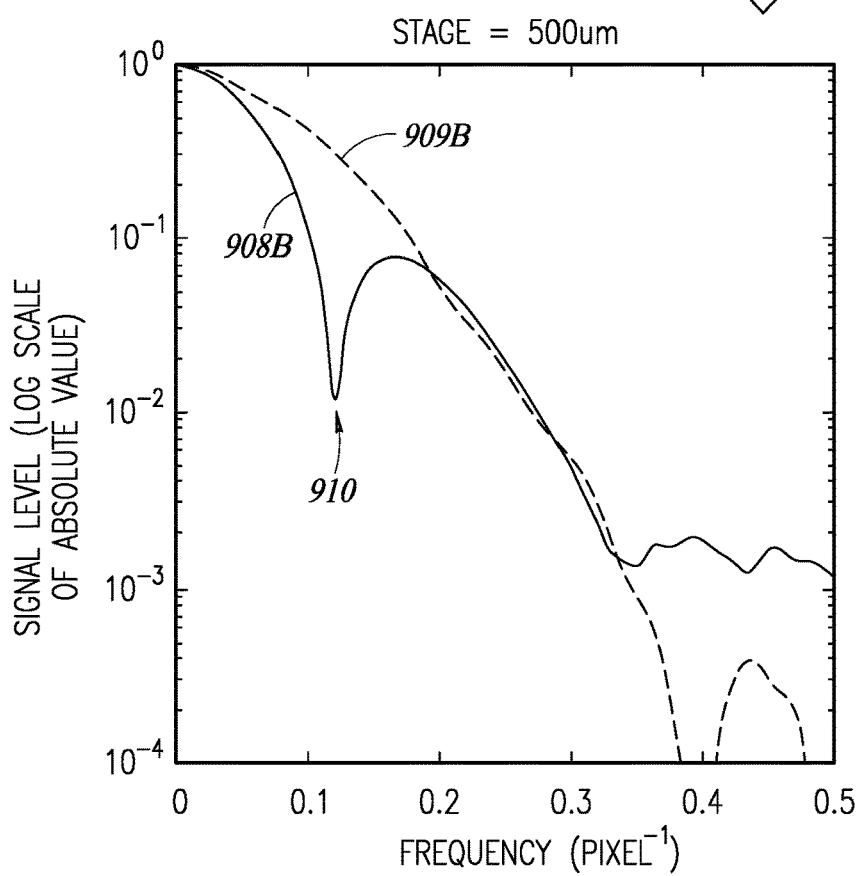
Figure 9D:
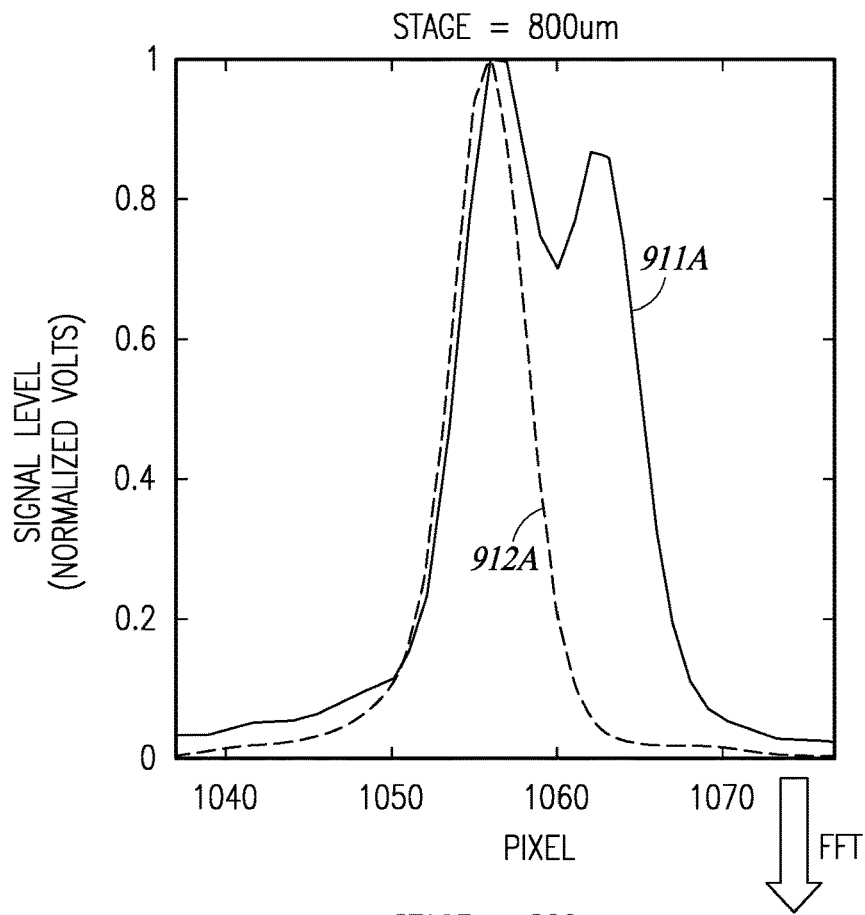
Figure 9H:
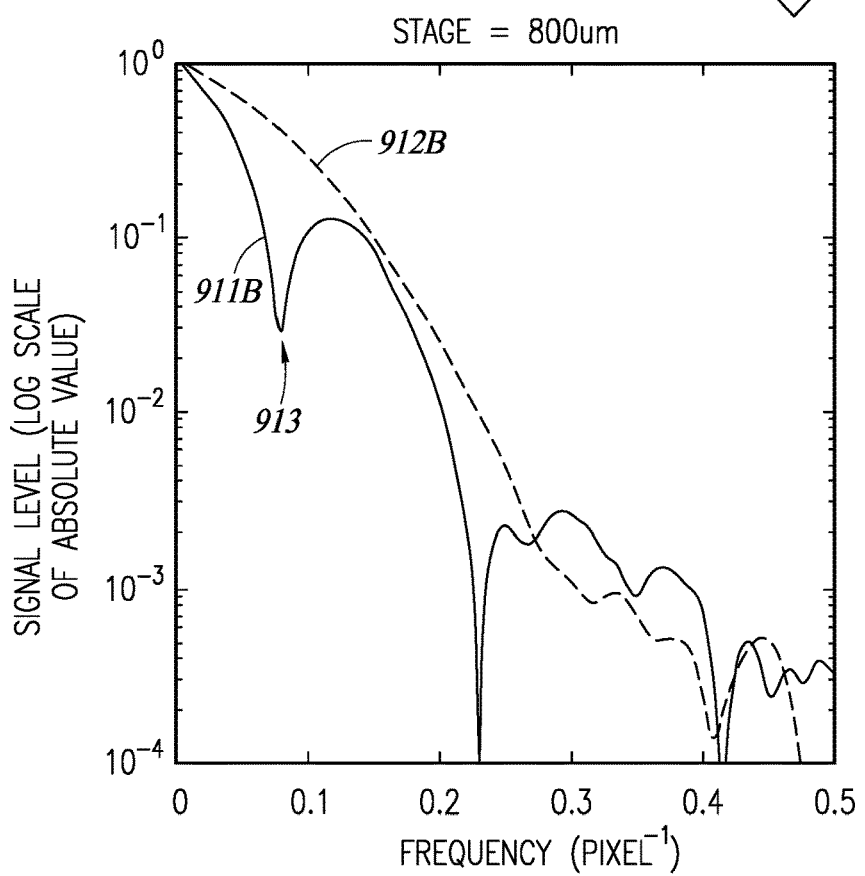
Figure 10A:
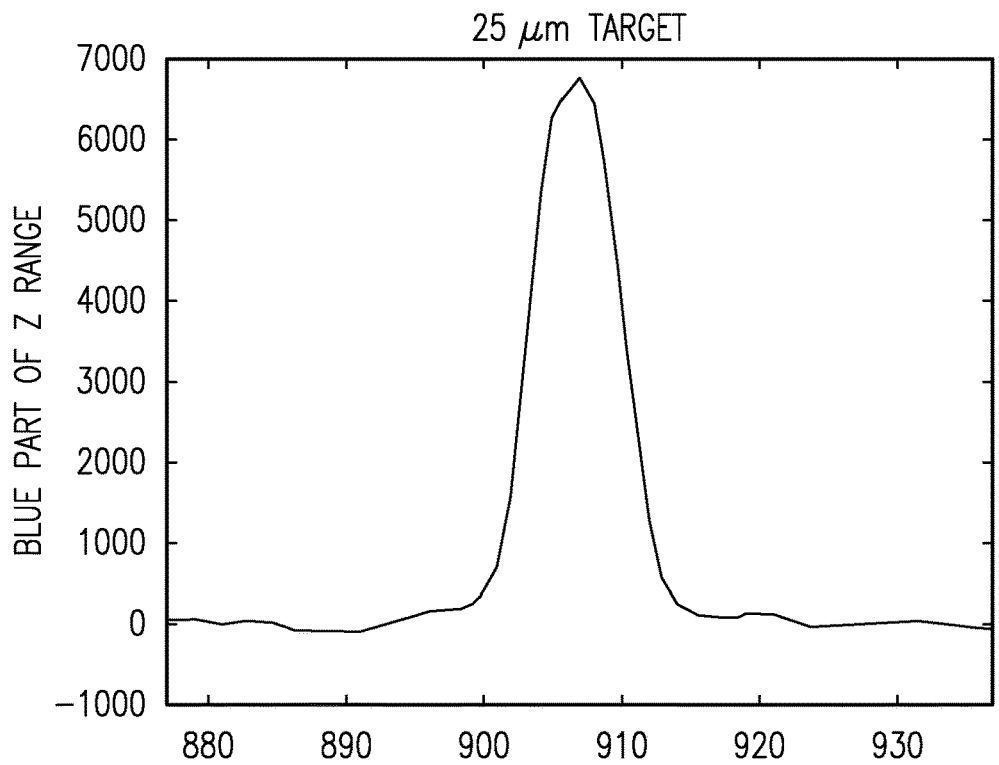
FIGS. 10A-10G are graphs depicting intensity profiles of workpieces having varying thicknesses (e.g., 25 μm, 50 μm, and 100 μm) measured by a CRS system, illustrating varying degrees of two wavelength peaks merging together depending on the thickness of a the workpiece and the distance from the optical pen.
Figure 10D:
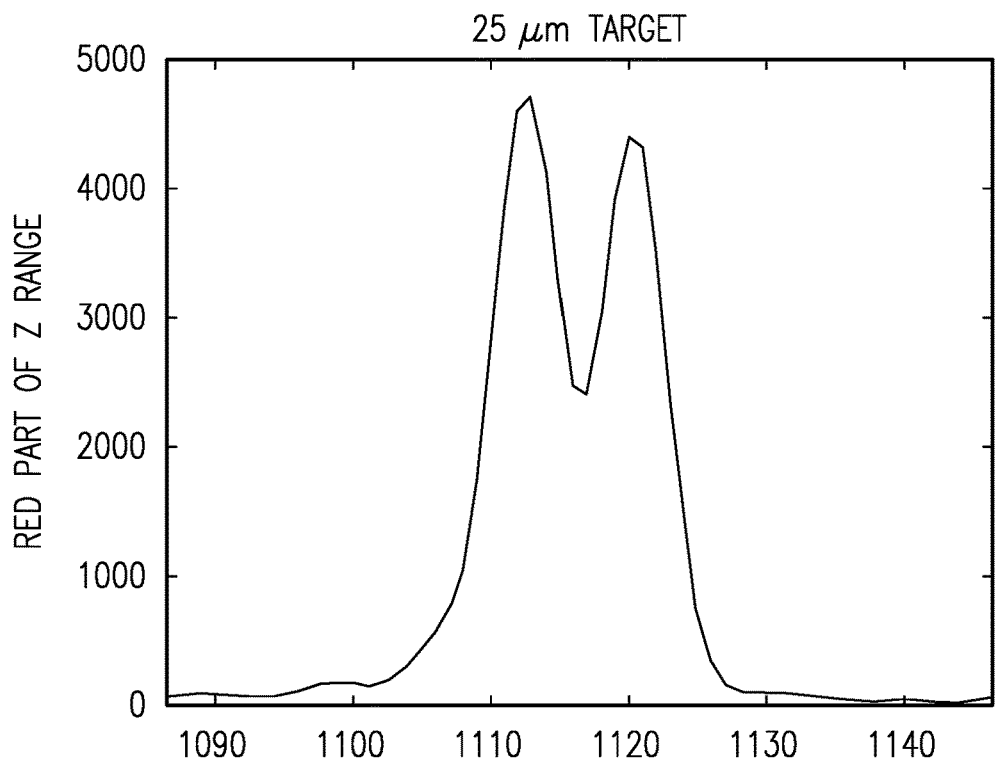
Figure 10B:
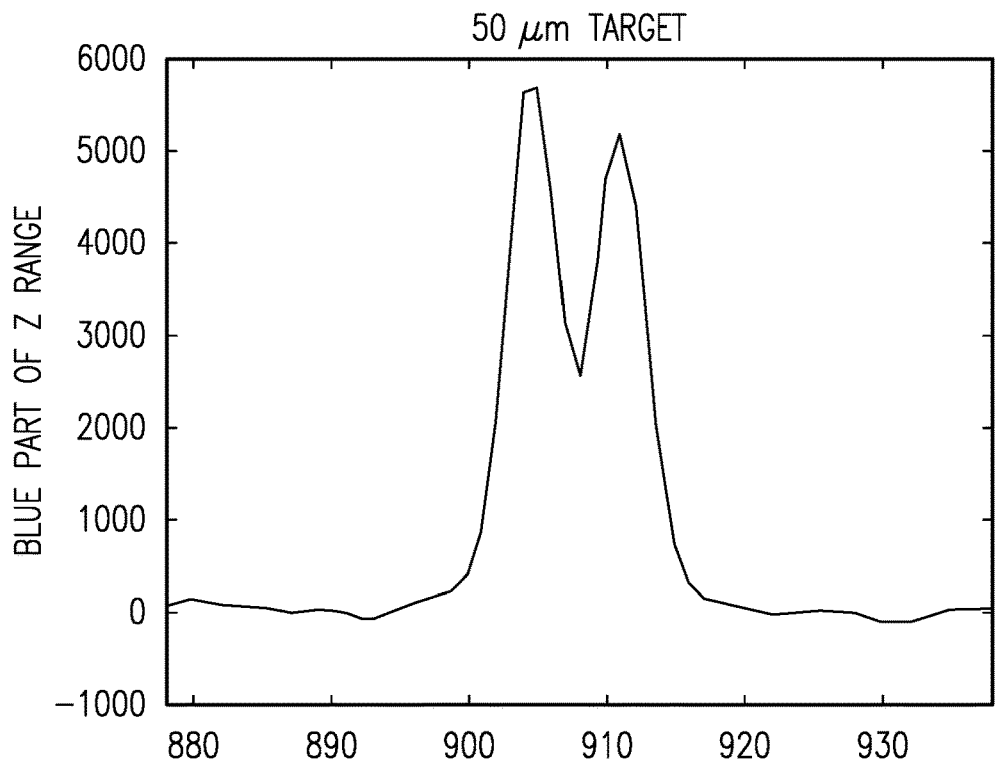
Figure 10E:
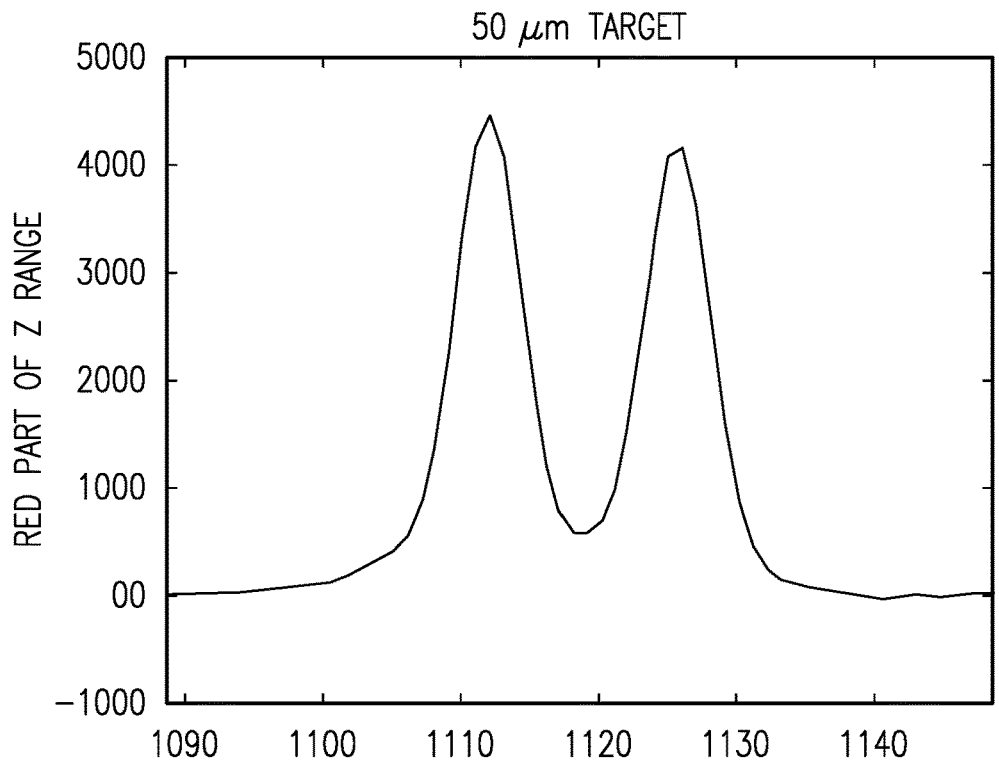
Figure 10C:
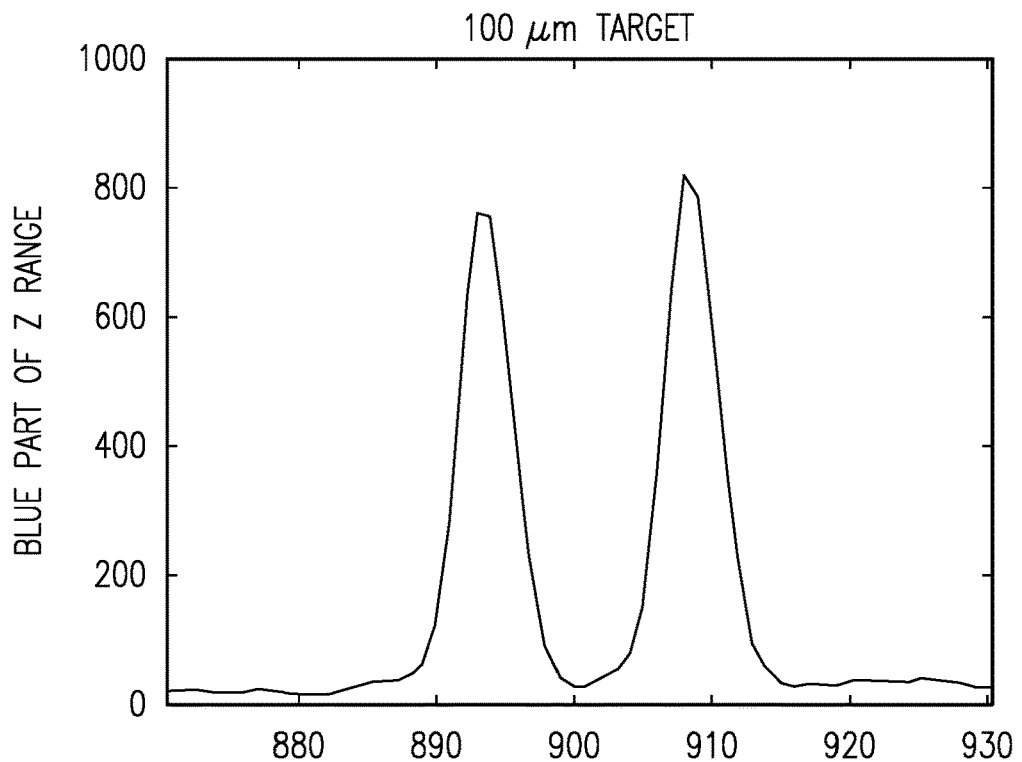
Figure 10F:
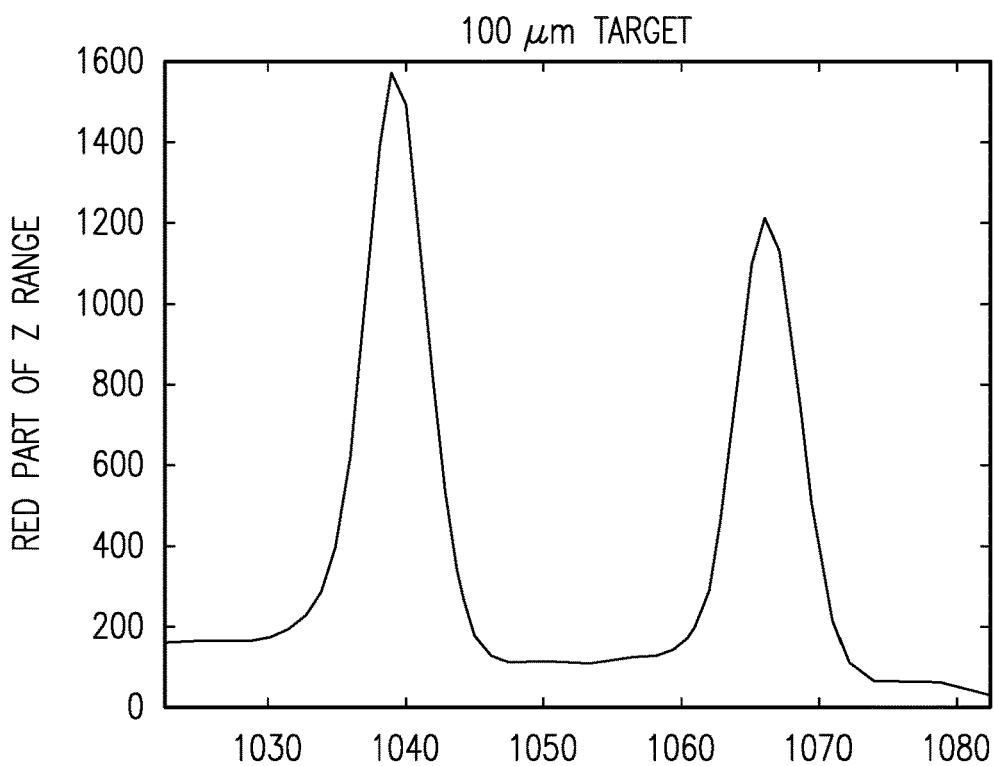
Figure 10G:
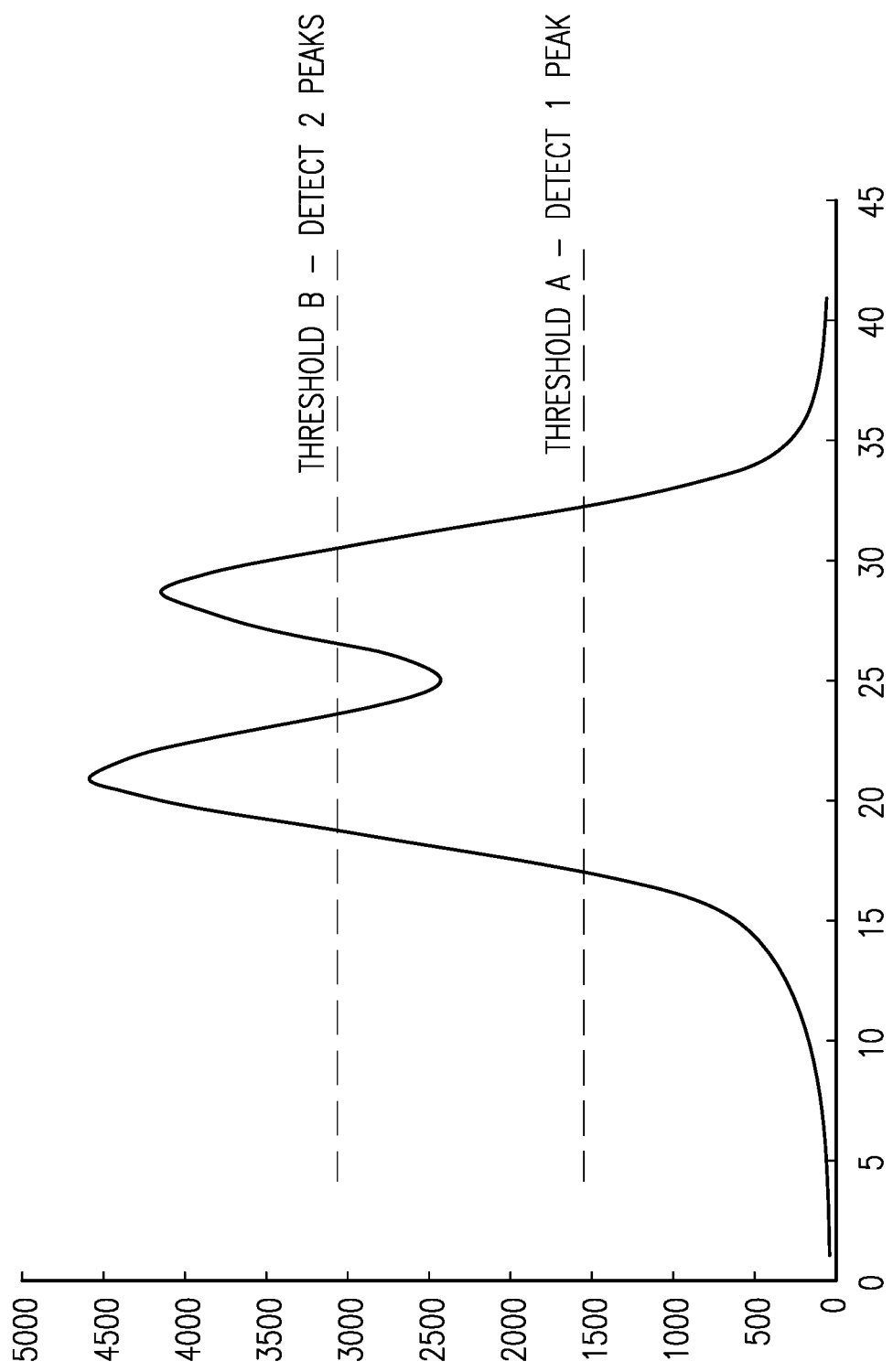

FIG. 9E illustrates the Fourier transforms 902B/903B of the intensity profiles 902A/903A of FIG. 9A. FIG. 9F illustrates the Fourier transforms 905B/906B of the intensity profiles 905A/906A of FIG. 9B. FIG. 9G illustrates the Fourier transforms 908B/909B of the intensity profiles 908A/909A of FIG. 9C. FIG. 9H illustrates the Fourier transforms 911B/912B of the intensity profiles 911A/912A of FIG. 9D.

FIGS. 9E-9H illustrate that the Fourier transforms 902B, 905B, 908B, 911B of the intensity profiles of the workpiece being measured, regardless of the location of the workpiece relative to the optical pen 120 of the CRS system 100, include a first dip 904, 907, 910, 913, which can be used to determine the workpiece thickness, as described above. It is noted that the Fourier transforms 903B, 906B, 909B, 912B of the intensity profiles of the reference workpiece, on the other hand, do not include any prominent dip. In various implementations, it has been experimentally determined that utilization of the "first dip" type technique disclosed herein (e.g., including calculations such as illustrated by EQUATION 12), enable a thickness of a workpiece (e.g., a 25 micron workpiece) to be determined with little or no error (e.g., error less than 10%, or 5%, etc.) over most (e.g., 90%, or 75%, etc.) of the wavelength range corresponding to the working range of a CRS system including an optical pen, including determinations for data such as that illustrated in FIGS. 9A-9D, where the wavelength peaks have merged (e.g., and in particular in FIGS. 9A and 9B where the two peaks visually appear as a single peak).

Due to the principles under which the first dip type techniques as disclosed herein operate (e.g., including utilization of transforms such as Fourier transforms which are sums of sinusoidals), as noted above, such techniques may be particularly effective for determining workpiece thicknesses as corresponding to spacings between first and second workpiece surfaces, although in some implementations may be less effective for simultaneously determining thicknesses between multiple layers of a workpiece (i.e., which may include top and bottom workpiece surfaces as well as additional middle workpiece surfaces as separating layers). Thus, in certain implementations, corresponding thickness measurement operations and/or modes as implemented according to principles disclosed herein may only be operable to determine thicknesses as corresponding to spacings between first and second workpiece surfaces and may not be operable to determine spacings between three or more workpiece surfaces (e.g., of multiple layers).

As noted above, in some implementations, a thickness of a workpiece that is determined in accordance with techniques disclosed herein may be utilized in combination with a distance to the workpiece that is determined in accordance with previously known methods. For example, given the illustrations of the two merged wavelength peaks in FIGS. 9A-9D (e.g., particularly in FIGS. 9A and 9B where the two peaks visually appear as a single peak), it will be appreciated that while in such instances previously known centroid type techniques for determining DICs may not be able to accurately determine the two distances to the two surfaces, they can be used to accurately determine a distance (e.g., distance Z3') to an approximate midpoint (e.g., between the distances Z1 and Z2' in accordance with determining a centroid of the merged peaks). The distance (e.g., distance Z3') calculated in this manner may be referenced or otherwise used in combination with the thickness measurement performed in accordance with techniques disclosed herein (e.g., as described above with respect to EQUATION 10 for determining the distance Z1, etc.).

In some exemplary embodiments, the CRS system 100 may be included and/or otherwise utilized in a machine system (e.g., in a vision inspection system or a coordinate measuring machine, etc.). In some instances, corresponding functions such as measuring a workpiece thickness along the optical axis OA of the CRS system 100 may be performed automatically in the machine system. As some examples of such machine systems, suitable machine vision inspection systems are described in U.S. Pat. Nos. 8,085,295 and 7,454,053, which are hereby incorporated herein by reference in their entireties.

While the preferred embodiments of the invention have been illustrated and described, numerous variations in the illustrated and described arrangements of features and sequences of operations will be apparent to one skilled in the art based on this disclosure. For example, while certain techniques have been described herein in relation to certain types of Fourier transform processing (e.g., in relation to FIGS. 7A-9H), it will be appreciated that other types of transform processing may similarly be utilized in accordance with the disclosed concepts to achieve similar results (e.g., utilizing Fourier-related transform processing such as cosine transforms, sine transforms, Laplace transforms, etc.). As another example, a CRS system including a chromatic point sensor (optical pen) has been shown herein. However, a CRS system including a chromatic line sensor, may be configured to operate according to the systems and methods disclosed herein. It will be appreciated that these and various other alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A chromatic range sensor (CRS) system that determines a workpiece thickness, the CRS system comprising:
    an optical pen comprising a confocal optical path including an optics portion providing axial chromatic dispersion and configured to focus different wavelengths at different distances proximate to a workpiece;
    an illumination source configured to generate multi-wavelength input light comprising an input spectral profile that is input to the optical pen;
    a CRS wavelength detector comprising a plurality of pixels with respective pixel positions distributed along a measurement axis of the CRS wavelength detector, wherein the CRS system is configured such that, when the optical pen is operably positioned relative to the workpiece to perform measurement operations, the optical pen inputs the input spectral profile and outputs corresponding radiation to first and second workpiece surfaces of the workpiece and receives reflected radiation from the first and second workpiece surfaces and outputs the reflected radiation to the CRS wavelength detector which provides output spectral profile data; and
    a processing portion configured to process the output spectral profile data to determine a thickness of the workpiece which corresponds to a spacing between the first and second workpiece surfaces of the workpiece, wherein the processing to determine the thickness comprises utilization of transform processing.

2. The CRS system of claim 1, wherein the transform processing comprises at least one of Fourier transform processing or Fourier-related transform processing and the utilization of the transform processing comprises:
    determining a transform of the output spectral profile data; and
    determining the thickness of the workpiece based at least in part on a first characteristic of the transform of the output spectral profile data.

3. The CRS system of claim 2, wherein the first characteristic corresponds to a first dip of the transform of the output spectral profile data.

4. The CRS system of claim 1, wherein the output spectral profile data comprises distance-dependent profile components having first and second wavelength peaks that correspond to the first and second workpiece surfaces, respectively, and the determining of the thickness of the workpiece is not dependent on processing the output spectral profile data to determine corresponding first and second measurement distances to the first and second workpiece surfaces.

5. The CRS system of claim 4, wherein the first and second wavelength peaks visually appear as a single peak in a representation of the output spectral profile data that is provided by the CRS wavelength detector.

6. The CRS system of claim 1, wherein for a workpiece having a spacing between the first and second workpiece surfaces of 5 microns, the utilization of the transform processing enables the processing portion to accurately determine the thickness of the workpiece with less than 10 percent error.

7. The CRS system of claim 1, wherein the processing portion is further configured to process the output spectral profile data to determine a measurement distance to the workpiece.

8. The CRS system of claim 7, wherein the processing to determine the measurement distance to the workpiece comprises processing the output spectral profile data to determine a centroid that is indicative of the measurement distance to the workpiece, while the processing to determine the thickness of the workpiece is not dependent on a determination of the centroid.

9. The CRS system of claim 7, wherein the determined measurement distance is to a point inside the workpiece that is between the first and second workpiece surfaces.

10. The CRS system of claim 9, wherein the determined measurement distance is determined according to a distance indicating coordinate that corresponds to an average of first and second wavelength peaks that correspond to the respective first and second workpiece surfaces.

11. The CRS system of claim 7, wherein the processing portion is further configured to utilize the determined measurement distance and the determined thickness of the workpiece to determine at least one of a first measurement distance to the first workpiece surface or a second measurement distance to the second workpiece surface.

12. The CRS system of claim 1, wherein the utilization of the transform processing comprises:
determining a Fourier transform of the output spectral profile data;
dividing the Fourier transform of the output spectral profile data by a Fourier transform of a reference to obtain a Fourier transform of target spectral profile data;
computing an inverse Fourier transform of the Fourier transform of the target spectral profile data to determine first and second wavelength peaks which correspond to respective first and second measurement distances to the first and second workpiece surfaces; and
determining the thickness of the workpiece based at least in part on a difference between the respective measurement distances to the first and second workpiece surfaces.

13. The CRS system of claim 1, wherein the CRS system is operable in a plurality of modes including a thickness measurement mode, for which the processing portion performs the processing to determine the thickness as part of the thickness measurement mode.

14. The CRS system of claim 13, wherein:
the plurality of modes further include a distance measurement mode for measuring a distance to a workpiece;
the CRS system is configured such that, during the distance measurement mode, when the optical pen is operably positioned relative to the workpiece to perform measurement operations, the optical pen inputs the input spectral profile and outputs corresponding radiation to the workpiece and receives reflected radiation from the workpiece and outputs the reflected radiation to the CRS wavelength detector which provides the output spectral profile data; and
the output spectral profile comprises a distance-dependent profile component having a wavelength peak that indicates a measurement distance to the workpiece.

15. The CRS system of claim 13, wherein the thickness measurement mode is only operable to determine thicknesses as corresponding to spacings between first and second workpiece surfaces and is not operable to determine spacings between three or more workpiece surfaces.

16. The CRS system of claim 1, wherein the CRS system is at least one of a chromatic point sensor system or a chromatic line sensor system.

17. A method of operating a chromatic range sensor (CRS) system to determine a workpiece thickness, the CRS system including:
an optical pen comprising a confocal optical path including an optics portion providing axial chromatic dispersion and configured to focus different wavelengths at different distances proximate to a workpiece;
an illumination source configured to generate multi-wavelength input light comprising an input spectral profile that is input to the optical pen; and
a CRS wavelength detector comprising a plurality of pixels with respective pixel positions distributed along a measurement axis of the CRS wavelength detector, the plurality of pixels receiving respective wavelengths and providing output spectral profile data;

the method comprising:
operating the CRS system with the optical pen operably positioned relative to the workpiece to perform measurement operations, the measurement operations including the optical pen inputting the input spectral profile and outputting corresponding radiation to first and second workpiece surfaces of the workpiece and receiving reflected radiation from the first and second workpiece surfaces and outputting the reflected radiation to the CRS wavelength detector which provides the output spectral profile data, and
processing the output spectral profile data to determine a thickness of the workpiece which corresponds to a spacing between the first and second workpiece surfaces of the workpiece, wherein the processing to determine the thickness comprises utilization of transform processing.

18. The method of claim 17, wherein the transform processing comprises at least one of Fourier transform processing or Fourier-related transform processing and the utilization of the transform processing comprises:
determining a transform of the output spectral profile data; and
determining the thickness of the workpiece based at least in part on a first characteristic of the transform of the output spectral profile data.

19. The method of claim 18, wherein the first characteristic corresponds to a first dip of the transform of the output spectral profile data.

20. The method of claim 17, wherein the output spectral profile data comprises distance-dependent profile components having first and second wavelength peaks that correspond to the first and second workpiece surfaces, respectively, and the determining of the thickness of the workpiece is not dependent on processing the output spectral profile data to determine corresponding first and second measurement distances to the first and second workpiece surfaces.

21. The method of claim 17, wherein the utilization of the transform processing comprises:
determining a Fourier transform of the output spectral profile data;
dividing the Fourier transform of the output spectral profile data by a Fourier transform of a reference to obtain a Fourier transform of target spectral profile data;
computing an inverse Fourier transform of the Fourier transform of the target spectral profile data to determine first and second wavelength peaks which correspond to respective first and second measurement distances to the first and second workpiece surfaces; and
determining the thickness of the workpiece based at least in part on a difference between the respective measurement distances to the first and second workpiece surfaces.

22. The method of claim 17, wherein:
the CRS system is operable in a plurality of modes including a thickness measurement mode and a distance measurement mode for measuring a distance to a workpiece;
the processing portion performs the processing to determine the thickness as part of the thickness measurement mode; and the method further comprises:

operating the CRS system during the distance measurement mode with the optical pen operably positioned relative to a workpiece to perform measurement operations, the measurement operations including the optical pen inputting an input spectral profile and outputting corresponding radiation to the workpiece and receiving reflected radiation from the workpiece and outputting the reflected radiation to the CRS wavelength detector which provides output spectral profile data which comprises a distance-dependent profile component having a wavelength peak that indicates a measurement distance to the workpiece; and processing the output spectral profile data to determine a distance to the workpiece.

23. The method of claim 22, wherein the thickness measurement mode is only operable to determine thicknesses as corresponding to spacings between first and second workpiece surfaces and is not operable to determine spacings between three or more workpiece surfaces.

24. A method of operating a chromatic range sensor (CRS) system, the CRS system including:

an optical pen comprising a confocal optical path including an optics portion providing axial chromatic dispersion and configured to focus different wavelengths at different distances proximate to a workpiece;

an illumination source configured to generate multi-wavelength input light comprising an input spectral profile that is input to the optical pen; and a CRS wavelength detector comprising a plurality of pixels with respective pixel positions distributed along a measurement axis of the CRS wavelength detector, the plurality of pixels receiving respective wavelengths and providing output spectral profile data;

the method comprising:

operating the CRS system with the optical pen operably positioned relative to the workpiece to perform measurement operations, the measurement operations including the optical pen inputting the input spectral profile and outputting corresponding radiation to first and second workpiece surfaces of the workpiece and receiving reflected radiation from the first and second workpiece surfaces and outputting the reflected radiation to the CRS wavelength detector which provides the output spectral profile data;

processing the output spectral profile data to determine a measurement distance to the workpiece, wherein the processing to determine the measurement distance includes determining a distance indicating coordinate corresponding to a pixel position of the CRS wavelength detector that indicates the measurement distance; and processing the output spectral profile data to determine a thickness of the workpiece which corresponds to a spacing between the first and second workpiece surfaces of the workpiece, wherein the processing to determine the thickness is not dependent on a determined measurement distance to the workpiece.

* * * * *